US008269454B2

(12) United States Patent
Yang

(10) Patent No.: US 8,269,454 B2
(45) Date of Patent: Sep. 18, 2012

(54) POWER CHARGING DEVICE WITH CHARGE SATURATION DISCONNECTOR THROUGH ELECTROMAGNETIC FORCE RELEASE

(76) Inventor: Tai-Her Yang, Dzan-Hwa (TW)

( * ) Notice: Subject to any disclaimer, the term of this patent is extended or adjusted under 35 U.S.C. 154(b) by 367 days.

(21) Appl. No.: 12/576,281

(22) Filed: Oct. 9, 2009

(65) Prior Publication Data

US 2011/0084649 A1    Apr. 14, 2011

(51) Int. Cl.
*H01M 10/46* (2006.01)
(52) U.S. Cl. ........................................ 320/107
(58) Field of Classification Search .................. 320/107, 320/111, 114; 200/16 B, 16 C; 439/353
See application file for complete search history.

(56) References Cited

U.S. PATENT DOCUMENTS

| | | | | |
|---|---|---|---|---|
| 4,163,134 A | * | 7/1979 | Budrose | 320/105 |
| 5,909,100 A | * | 6/1999 | Watanabe et al. | 320/108 |
| 6,819,082 B2 | * | 11/2004 | Yang | 320/112 |
| 2001/0043050 A1 | * | 11/2001 | Fisher, Jr. | 320/101 |

* cited by examiner

*Primary Examiner* — Edward Tso
(74) *Attorney, Agent, or Firm* — Bacon & Thomas, PLLC

(57) ABSTRACT

A power charging device with charge saturation disconnection through electromagnetic force release is formed by a charging power supply, charging control device, a magnetic actuator conductive device, power excitation windings, a rechargeable discharge device, and various detection devices provided for detection of the charge situation of the rechargeable discharge device.

22 Claims, 11 Drawing Sheets

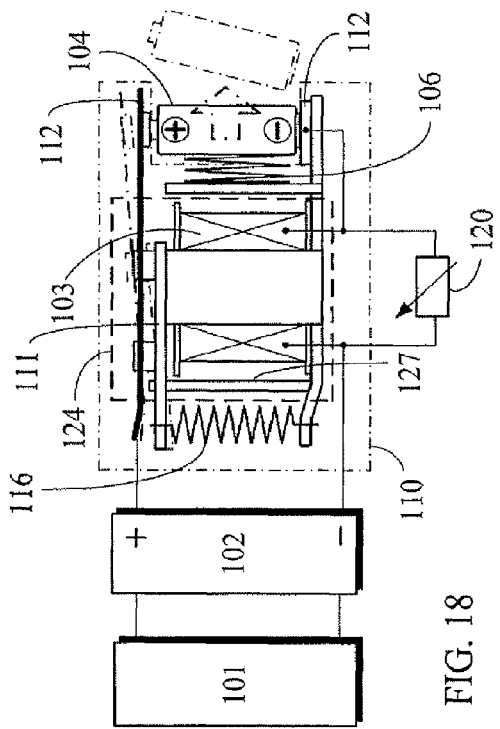
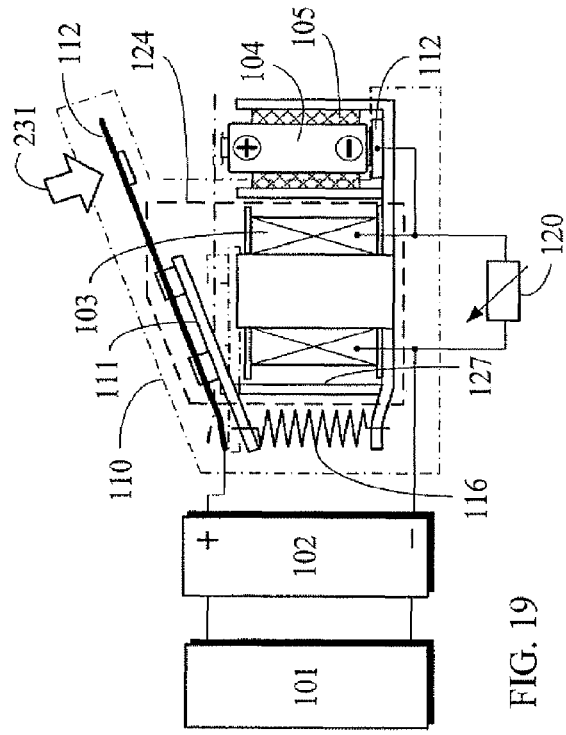
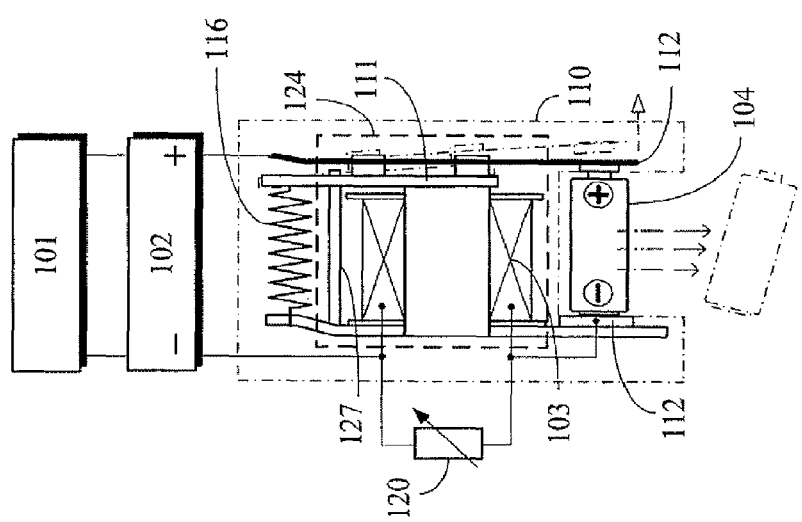
FIG. 18
FIG. 19
FIG. 17

POWER CHARGING DEVICE WITH CHARGE SATURATION DISCONNECTOR THROUGH ELECTROMAGNETIC FORCE RELEASE

BACKGROUND OF THE INVENTION (a) Field of the Invention

The present invention relates to a power charging device, in which a rechargeable device is placed within a magnetic actuator conductive device of the power charging device, and in which the rechargeable device is disconnected from the magnetic actuator conductive device when the rechargeable device attains charge saturation.

(b) Description of the Prior Art

Typically, a rechargeable device is placed within a power charging device and stays in a same position even after charge saturation, which often leads to overcharge.

SUMMARY OF THE INVENTION

A power charging device with a charge saturation disconnector utilizing electromagnetic force release is formed by a charging power supply, a charging control device, a magnetic actuator conductive device, power excitation windings, a rechargeable discharge device, and various detection devices optionally provided as needed for detection of the charge situation of the rechargeable discharge device.

When rechargeable discharge device (104) is placed by polarity within magnetic actuator conductive device (110) of the power charging device, the rechargeable discharge device (104) is clamped by conductive device (112) of the magnetic actuator conductive device (110), and charging power is input.

When the rechargeable discharge device (104) is charged to saturation, 1) power excitation windings (103) can be directly controlled by the charge saturation detection device to be conductive or disconnect to cause the magnetic driving structure (111) to be displaced for releasing the rechargeable discharge device (104) clamped by the conductive device (112) of the magnetic actuator conductive device (110); and/or 2) a signal from a charge saturation detection device (107) is transmitted to the charging control device (102) to control the power excitation windings (103) to be conductive or disconnect and cause the magnetic driving structure (111) to be displaced for releasing the rechargeable discharge device (104) clamped by the conductive device (112) of the magnetic actuator conductive device (110); and/or 3) the charging control device (102) performs a trickling charge to the rechargeable discharge device (104) for a set time delay, and then the conductive device (112) is driven to control the power excitation windings (103) to be conductive or disconnect to cause the magnetic driving structure (111) to be displaced for releasing the rechargeable discharge device (104) clamped by the conductive device (112) of the magnetic actuator conductive device (110); and/or 4) a charge reduction signal of the charge saturation detection device (107) is transmitted to the charging control device (102) to reduce the charge current to the rechargeable discharge device (104) before a charge saturation signal of the charge saturation detection device (107) further drives the charging control device (102) to control the power excitation windings (103) to be conductive or disconnect and cause the magnetic driving structure (111) to be displaced for releasing the rechargeable discharge device (104) clamped by the conductive device (112) of the magnetic actuator conductive device (110) to implement two-stage charging; and/or 5) the detection charge saturation signal of the charging state detection device (107) repeatedly controls the charging control device (102) to gradually reduce the charge current to the rechargeable discharge device (104), and finally the charging control device (102) is controlled to drive the power excitation windings (103) to be conductive or disconnect to cause the magnetic driving structure (111) to be displaced for releasing the rechargeable discharge device (104) clamped by the conductive device (112) of the magnetic actuator conductive device (110), and then by means of a driving force such as gravity, or the force from an installed prestressing device utilizing magnetic, current, or mechanical force, (for example, the elastic force from a prestressing spring), or the thrust of electromagnetic driving transposition mechanism (115), at least one electrode side of the rechargeable discharge device (104) disconnects from the magnetic actuator conductive device (110) to stop charging.

BRIEF DESCRIPTION OF THE DRAWINGS

FIG. 17 is a structural drawing showing an embodiment of the power excitation windings (103) with charge current passing through for driving the magnetic actuator conductive device (110) with the functionalities of prestressing release and magnetic clamping, according to the present invention;

FIG. 18 is a structural drawing showing an embodiment of the magnetic actuator conductive device (110) of FIG. 17 equipped with prestressing spring (106);

FIG. 19 is a structural drawing showing an embodiment including a press type boot structure (231) for activating charging function, according to the present invention;

DESCRIPTION OF MAIN COMPONENT SYMBOLS

Figure 3:
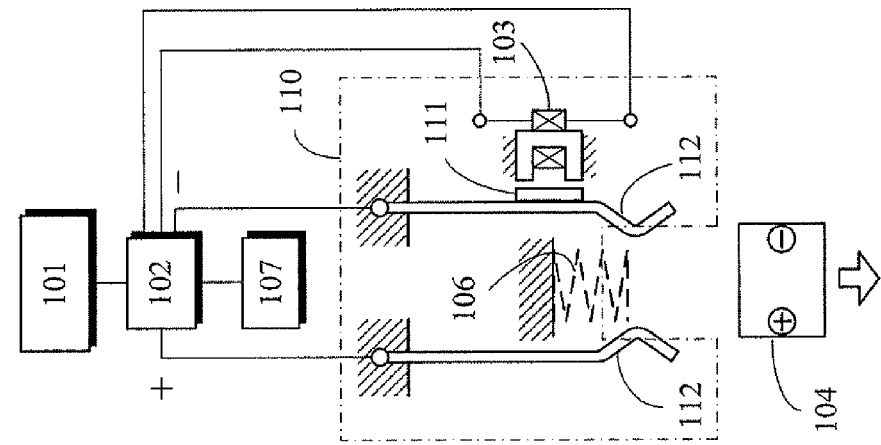
FIG. 3 is a structural drawing showing an embodiment, wherein the magnetic actuator conductive device (110) uses powered excitation, and then at least one electrode side of the rechargeable discharge device (104) disconnects from the magnetic actuator conductive device (110) to stop charging, according to the present invention.

101: Charging power supply
102: Charging control device
103: Power excitation windings
104: Rechargeable discharge device
105: Positioning ring structure
106: Prestressing spring
107: Charging state detection device
108: Prestressing reed
110: Magnetic actuator conductive device
111 Magnetic driving structure
112: Conductive device
114: Prestressing pushed electromagnetic driving suction device
115: Electromagnetic driving transposition mechanism
116: Prestressing homing spring
117: Touch switch
120: Parallel shunt circuit device
124: Electromagnetic actuator
126: Reed contact
127: Magnetic circuit with iron-core
229: Clamping structure
231: Press type boot structure
1060: Released structural unit for rechargeable discharge device (104)
1081: Relay conductive structure

DETAILED DESCRIPTION OF THE PREFERRED EMBODIMENTS

A power charging device with a charge saturation disconnector that operates through electromagnetic force release is formed by a charging power supply, charging control device, magnetic actuator conductive device, power excitation windings, rechargeable discharge device, and various detection devices optionally provided as needed for detection of the charge situation of the rechargeable discharge device.

Figure 1:
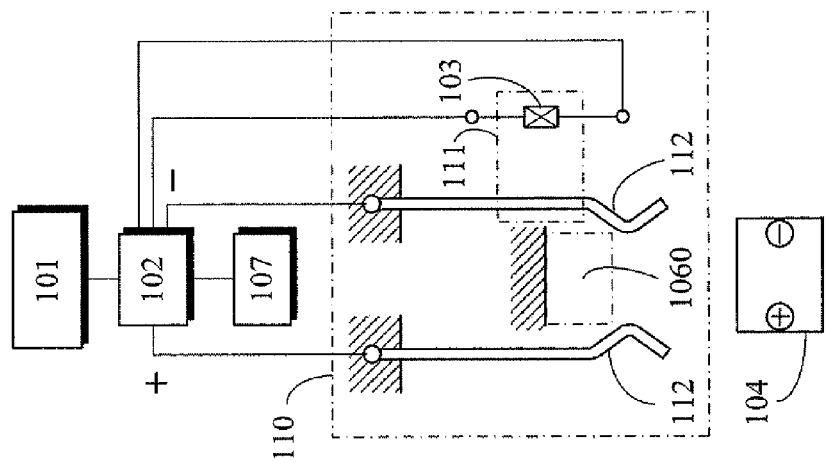
FIG. 1 is a structural drawing showing the main components of the present invention.

FIG. 1 is a structural drawing showing the main components of the present invention.

As showed in FIG. 1, the power charging device with charge saturation disconnector through electromagnetic force release transmits power energy from a charging power supply (101) to charging control device (102), and then under the control of the charging control device (102) transmits the power energy to magnetic actuator conductive device (110) for charging rechargeable discharge device (104) clamped by conductive device (112) installed within the magnetic actuator conductive device (110). The main components include:

Charging control device (102): formed by electromechanical or solid state electronic elements, including a microprocessor and necessary software, for receiving input from the charging power supply (101) to output and control the charge voltage and current for the rechargeable discharge device (104), and receiving a signal of a charging state detection device (107) from the rechargeable discharge device (104) to control the timing of power supply to the power excitation windings (103); in which the charging control device (102) can be a single circuit device or combined with the power supply (101) to be an integrated structure;

Power excitation windings (103): formed by elements or a device which can convert input power energy to magnetic energy, installed within the magnetic actuator conductive device (110), or placed at the position where the power excitation windings (103) can interact with the magnetic actuator conductive device (110); in which the power excitation windings (103) are directly controlled by the charging state detection device (107) or by the charging control device (102) to be in conductive excitation state or disconnected to cause magnetic driving structure (111) to be displaced for releasing the rechargeable discharge device (104) clamped by the conductive device (112) of the magnetic actuator conductive device (110), and then the rechargeable discharge device (104) further disconnects by means of released structural unit (1060) for rechargeable discharge device (104). The released structural unit (1060) further disconnects the rechargeable discharge device (104) through a structural space as a result of gravity displacement, or by a force exerted by a prestressing device that utilizes magnetic force, current force, or mechanic force, or a prestressing spring, or by an electromagnetic driving transposition mechanism. By means of the at least one acting force such as gravity, and/or the elastic force from the prestressing spring, and/or the thrust of the electromagnetic driving transposition mechanism, at least one electrode side of the rechargeable discharge device (104) disconnects from the conductive device (112) to stop charging;

Rechargeable discharge device (104) and conductive device (112) of the magnetic actuator conductive device (110): related to their relative position relationship and operational functions, in which the rechargeable discharge device (104) is clamped by the conductive device (112) when the rechargeable discharge device (104) is installed therein, and both of them present a conductive state with a same polarity for receiving transmitted charging energy; and Charging state detection device (107): related to an installation in which one or more charging state detection devices (107) can be installed at one or more positions, including 1) within the rechargeable discharge device (104); and/or 2) within the near rechargeable discharge device (104); and/or 3) linking the electrode side of the rechargeable discharge device (104); and/or 4) linking the output side of the charging power supply of the charging control device (102) to transmit the detection signal of charging state, and especially the detection signal of charge saturation;

The charging state detection device (107) of the rechargeable discharge device (104) may, by way of example and not limitation:

1) form a terminal voltage detection device installed at positive and negative electrodes of the charging control device (102) to perform terminal voltage detection, the positive and negative electrodes outputting charging energy, or be installed at positive and negative electrodes of the rechargeable discharge device (104), wherein the above two installation alternatives can detect the terminal voltage signal when the rechargeable discharge device (104) is charged for determining a charge saturation state for the rechargeable discharge device (104); and/or 2) form a detection circuit with sudden decreased charge saturation voltage, which adopts the terminal voltage detection device as the charging state detection device (107), wherein when the rechargeable discharge device (104) is charge saturated, the terminal voltage decreases suddenly; the terminal voltage detection device can be installed at positive and negative electrodes of the charging control device (102), in which the positive and negative electrodes output charging energy, or can be installed at positive and negative electrodes of the rechargeable discharge device (104), wherein the above two installation alternatives can detect a power signal of sudden decreased terminal voltage when the rechargeable discharge device (104) is charge saturated; and/or 3) form a charge current detection circuit, which provides a signal of current value when the charge current decreases in charge saturation; and/or 4) be formed by a thermal switch device, which responds by changing a switch function when the temperature of the rechargeable discharge device (104) in charge saturation rises to a set value; and/or 5) be formed by an element with a coefficient of resistance related to positive or negative temperature, which exhibits a change of relative resistance value when the temperature of the rechargeable discharge device (104) in charge saturation rises to the set value; and/or 6) be formed by an internal resistance measurement circuit, which detects a signal of relative resistance value when the internal resistance of the rechargeable discharge device (104) in charge saturation undergoes a relative change; and/or 7) be formed by the other typical methods and devices which can detect the rechargeable discharge device (104) in charge saturation.

Through the above devices, when the rechargeable discharge device (104) is placed within the conductive device (112), depending on the polarity, the rechargeable discharge device (104) is clamped and charging energy is input by the conductive device (112).

When the rechargeable discharge device (104) is charge saturated, there are one or more operations to be performed through the detection by the charging state detection device (107) of the rechargeable discharge device (104), including:

1) when the rechargeable discharge device (104) is charge saturated, the power excitation windings (103) can be directly controlled by the charge saturation detection device to be conductive or disconnect to cause the magnetic driving structure (111) to displace for releasing the rechargeable discharge device (104) clamped by the conductive device (112); and/or 2) when the rechargeable discharge device (104) is charge saturated, a signal of the charge saturation detection device (107) is transmitted to the charging control device (102) to control the power excitation windings (103) to be conductive or disconnect to cause the magnetic driving structure (111) to displace for releasing the rechargeable discharge device (104) clamped by the conductive device (112); and/or 3) when the rechargeable discharge device (104) is charge saturated, the signal of the charge saturation detection device (107) is transmitted to the charging control device (102), and the charging control device (102) performs trickling charge to the rechargeable discharge device (104) for a set time delay, and then the charging control device (102) is driven to control the power excitation windings (103) to be conductive or disconnect to cause the magnetic driving structure (111) to displace for releasing the rechargeable discharge device (104) clamped by the conductive device (112); and/or 4) when the rechargeable discharge device (104) is charge saturated, the signal of the charge saturation detection device (107) is transmitted to the charging control device (102) to reduce the charge current to the rechargeable discharge device (104) while waiting for the detection charge saturation signal of the charge saturation detection device (107) to further drive the charging control device (102) to control the power excitation windings (103) to be conductive or disconnect to cause the magnetic driving structure (111) to displace for releasing the rechargeable discharge device (104) clamped by the conductive device (112) to implement two-stage charging; and/or 5) when the rechargeable discharge device (104) is charge saturated, the detection charge saturation signal of the charging state detection device (107) repeatedly controls the charging control device (102) to gradually reduce the charge current to the rechargeable discharge device (104), and finally the charging control device (102) is controlled to drive the power excitation windings (103) to be conductive or disconnect to cause the magnetic driving structure (111) to displace for releasing the rechargeable discharge device (104) clamped by the conductive device (112).

When the power charging device with charge saturation disconnector through electromagnetic force release is charge saturated, there are one or more different ways of releasing the rechargeable discharge device (104) by the conductive device (112) of the magnetic actuator conductive device (110), depending on the different structures, including:

1) when the state of the magnetic actuator conductive device (110) changes from clamping to releasing, at least one electrode side of the rechargeable discharge device (104) disconnects from the conductive device (112) of the magnetic actuator conductive device (110) through gravity to stop charging; and/or 2) by means of installing a prestressing device with magnetic force, current force, or mechanical force, such as a prestressing spring (106), the rechargeable discharge device (104) is pushed to disconnect in a gravity direction, anti-gravity direction, or other directions; if the prestressing spring (106) is installed, the prestressing spring (106) is pressurized to be in a prestressed state when the rechargeable discharge device (104) is placed therein, and when the rechargeable discharge device (104) is charge saturated, the conductive device (112) of the magnetic actuator conductive device (110) releases the rechargeable discharge device (104) through the prestressing of the prestressing spring (106) to cause at least one electrode side of the rechargeable discharge device (104) to be pushed away from the conductive device (112) of the magnetic actuator conductive device (110) in the direction of the prestressing of the prestressing spring (106) to stop charging; the pushed direction can be in the gravity direction of the rechargeable discharge device (104) itself, the anti-gravity direction of the rechargeable discharge device (104) itself, or other directions; and/or 3) when the rechargeable discharge device (104) is charge saturated, at least one electrode side of the rechargeable discharge device (104) is pushed to disconnect from the conductive device (112) of the magnetic actuator conductive device (110) through the thrust of the electromagnetic driving transposition mechanism (115) in the gravity direction of the rechargeable discharge device (104) itself, the anti-gravity direction of the rechargeable discharge device (104) itself, or other directions.

Figure 2:
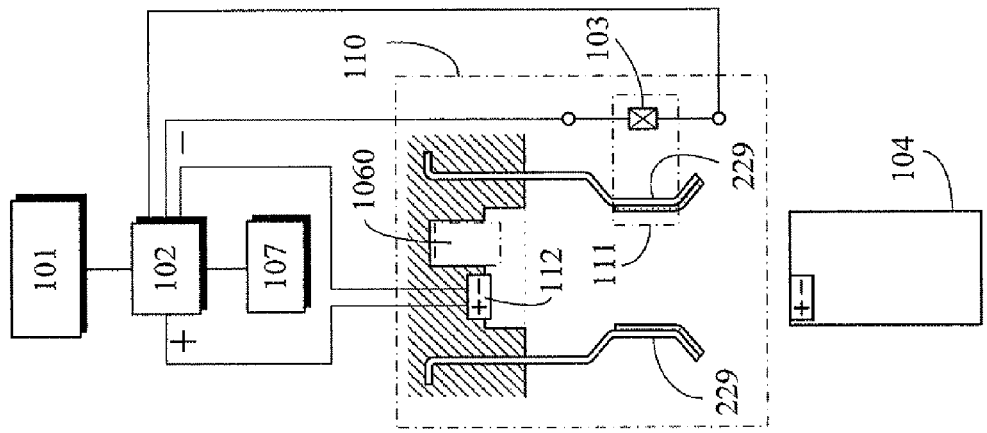
FIG. 2 is a structural drawing showing an embodiment of FIG. 1 applied to the rechargeable discharge device (104) with a conductive structure installed on one side.

FIG. 2 is a structural drawing showing an embodiment of FIG. 1 applied to a rechargeable discharge device (104) with a conductive structure installed on one side. As shown in FIG. 2, the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed therein; the remaining structures and operations are the same as those of the embodiment in FIG. 1.

FIG. 3 is a structural drawing showing an embodiment of FIG. 1, wherein the magnetic actuator conductive device (110) uses powered excitation, and then at least one electrode side of the rechargeable discharge device (104) disconnects from the magnetic actuator conductive device (110) to stop charging, according to the present invention.

As shown in FIG. 3, the charging power supply (101) is formed by a power supply device with direct current (DC), DC converted from alternating current (AC), or DC converted from DC for charging the rechargeable discharge device (104) via the charging control device (102). The main components include:

Charging control device (102): formed by electromechanical or solid state electronic elements, including a microprocessor and necessary software, for receiving input of the charging power supply (101) to output and control the charge voltage and current over the rechargeable discharge device (104), and receiving a signal of charging state detection device (107) from the rechargeable discharge device (104) to control the power timing to the power excitation windings (103); in which the charging control device (102) can be a single circuit device or combined with the power supply (101) to be an integrated structure;

Power excitation windings (103): formed by elements or a device which can convert input power energy to magnetic energy, installed within the magnetic actuator conductive device (110), or placed at the position where the power excitation windings (103) can interact with the magnetic actuator conductive device (110); in which the power excitation windings (103) are directly controlled by the charging state detection device (107) or by the charging control device (102), and when the rechargeable discharge device (104) is charge saturated, the control modes include one or more of the following:

1) power excitation windings (103) can be directly controlled by charge saturation detection device to be conductive or disconnect to cause magnetic driving structure (111) to be displaced for releasing the rechargeable discharge device (104) clamped by the conductive device (112) of the magnetic actuator conductive device (110); and/or 2) a signal of charge saturation detection device (107) may be transmitted to charging control device (102) to control the power excitation windings (103) to be conductive or disconnect to cause the magnetic driving structure (111) to displace for releasing the rechargeable discharge device (104) clamped by the conductive device (112) of the magnetic actuator conductive device (110); and/or 3) the charging control device (102) performs trickling charge of the rechargeable discharge device (104) for a set time delay, and then the charging control device (102) is driven to control the power excitation windings (103) to be conductive or disconnect to cause the magnetic driving structure (111) to displace for releasing the rechargeable discharge device (104) clamped by the conductive device (112) of the magnetic actuator conductive device (110); and/or 4) the signal of the charge saturation detection device (107) is transmitted to the charging control device (102) to reduce the charge current to the rechargeable discharge device (104) while waiting for the detection charge saturation signal of the charge saturation detection device (107) to further drive the charging control device (102) to control the power excitation windings (103) to be conductive or disconnect and cause the magnetic driving structure (111) to be displaced for releasing the rechargeable discharge device (104) clamped by the conductive device (112) of the magnetic actuator conductive device (110) to implement two-stage charging; and/or 5) the detection charge saturation signal of the charging state detection device (107) repeatedly controls the charging control device (102) to gradually reduce the charge current to the rechargeable discharge device (104), and finally the charging control device (102) is controlled to drive the power excitation windings (103) to be conductive or disconnect to cause the magnetic driving structure (111) to be displaced for releasing the rechargeable discharge device (104) clamped by the conductive device (112) of the magnetic actuator conductive device (110), and then by means of gravity and/or the elastic force from the prestressing spring (106), at least one electrode side of the rechargeable discharge device (104) disconnects from the magnetic actuator conductive device (110) to stop charging.

Rechargeable discharge device (104): formed by a rechargeable alkaline battery, or various rechargeable discharge batteries, an ultracapacitor, or a capacitor, and installed within the conductive device (112) of the magnetic actuator conductive device (110) to be clamped and recharged, in which when the magnetic actuator conductive device (110) is driven by power excitation, depending on the relative position relationship between the rechargeable discharge device (104) and the magnetic actuator conductive device (110), the conductive device (112) releases the clamped rechargeable discharge device (104), and then by means of gravity and/or the elastic force from the prestressing spring (106), at least one electrode side of the rechargeable discharge device (104) disconnects from the magnetic actuator conductive device (110) to stop charging;

Charging state detection device (107): formed by one or more charging state detection devices for detecting the charge saturation state of the rechargeable discharge device (104), in which when the rechargeable discharge device (104) is charge saturated, the rechargeable discharge device (104) can be released to stop charging through one or more of the following control methods:

1) power excitation windings (103) can be directly controlled by the charge saturation detection device (107) to be conductive or disconnect to cause magnetic driving structure (111) to displace for releasing the rechargeable discharge device (104) clamped by the conductive device (112) of the magnetic actuator conductive device (110); and/or 2) a signal of charge saturation detection device (107) is transmitted to charging control device (102) to control the power excitation windings (103) to be conductive or disconnect to cause the magnetic driving structure (111) to displace for releasing the rechargeable discharge device (104) clamped by the conductive device (112) of the magnetic actuator conductive device (110); and/or 3) the charging control device (102) performs trickling charge to the rechargeable discharge device (104) for a set time delay, and then the charging control device (102) is driven to control the power excitation windings (103) to be conductive or disconnect to cause the magnetic driving structure (111) to be displaced for releasing the rechargeable discharge device (104) clamped by the conductive device (112) of the magnetic actuator conductive device (110); and/or 4) the signal of the charge saturation detection device (107) is transmitted to the charging control device (102) to reduce the charge current to the rechargeable discharge device (104) while waiting for the detection charge saturation signal of the charge saturation detection device (107), which further drives the charging control device (102) to control the power excitation windings (103) to be conductive or disconnect to cause the magnetic driving structure (111) to displace for releasing the rechargeable discharge device (104) clamped by the conductive device (112) of the magnetic actuator conductive device (110) to implement two-stage charging; and/or 5) the detection charge saturation signal of the charging state detection device (107) repeatedly controls the charging control device (102) to gradually reduce the charge current to the rechargeable discharge device (104), and finally the charging control device (102) is controlled to drive the power excitation windings (103) to be conductive or disconnect to cause the magnetic driving structure (111) to displace for releasing the rechargeable discharge device (104) clamped by the conductive device (112) of the magnetic actuator conductive device (110), and then by means of gravity and/or the elastic force from the prestressing spring (106), at least one electrode side of the rechargeable discharge device (104) disconnects from the magnetic actuator conductive device (110) to stop charging.

As shown in FIG. 3, the operation of the magnetic actuator conductive device (110) of the power charging device with charge saturation disconnector through electromagnetic force release is as follows:

The magnetic actuator conductive device (110) uses the conductive devices (112) to respectively conduct charging current to the positive and negative electrodes of the rechargeable discharge device (104), and the conductive device (112) and the magnetic driving structure (111) to provide the magnetic actuator conductive device (110) by combination or individually. When the rechargeable discharge device (104) is installed within the conductive device (112), the prestressing spring (106) is prestressed by the rechargeable discharge device (104), and the rechargeable discharge device (104) is charged through the prestressing and conductive characteristics of the conductive device (112). When the rechargeable discharge device (104) installed within the conductive device (112) is charge saturated, the power excitation windings (103) is excited to drive the magnetic driving structure (111), and then by means of gravity and/or the elastic force from the prestressing spring (106), at least one electrode side of the rechargeable discharge device (104) disconnects from the magnetic actuator conductive device (110) to stop charging.

The embodiment as shown in FIG. 3 can further be applied to a rechargeable discharge device (104) with conductive structure installed on one side.

Figure 4:
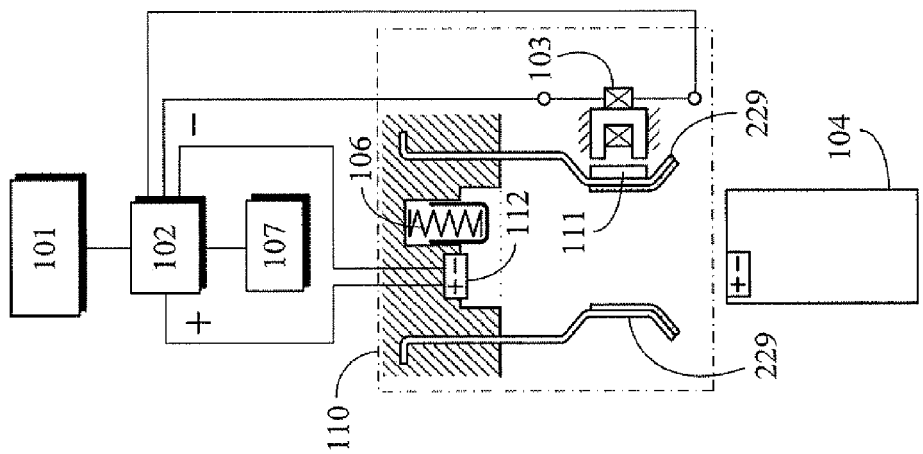
FIG. 4 is a structural drawing showing an embodiment of FIG. 3 applied to the rechargeable discharge device (104) with conductive structure installed on one side.

FIG. 4 is a structural drawing showing an embodiment of FIG. 3 applied to the rechargeable discharge device (104) with a conductive structure installed on one side. As shown in FIG. 4, the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed therein; the remaining structures and operations are the same as those of the embodiment in FIG. 3.

Figure 5:
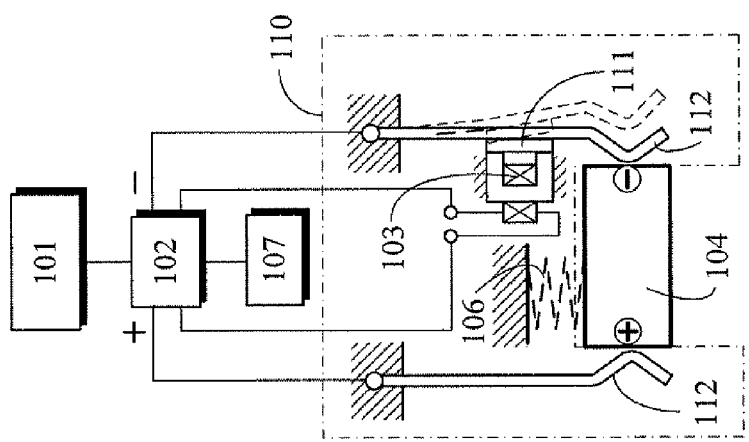
FIG. 5 is a structural drawing showing an embodiment of the power excitation windings (103) driving the magnetic actuator conductive device (110) with the functionalities of prestressing release and magnetic clamping, according to the present invention.

FIG. 5 is a structural drawing showing an embodiment in which the power excitation windings (103) drive the magnetic actuator conductive device (110) with the functionalities of prestressing release and magnetic clamping, according to the present invention.

As shown in FIG. 5, the rechargeable discharge device (104) is clamped by one or more pressurized clamping forces when the rechargeable discharge device (104) is placed therein; the operational functions are that the charging control device (102) senses output of charge current to the rechargeable discharge device (104), the charging control device (102) powers excitation of the power excitation windings (103) to attract the magnetic driving structure (111) to cause the conductive device (112) to pressurize for clamping the rechargeable discharge device (104) and prevent releasing from the conductive device (112), and the conductive device (112) pressurizes to clamp the rechargeable discharge device (104), and transmits charging energy to the rechargeable discharge device (104); when the rechargeable discharge device (104) is charge saturated, the charging state detection device (107) detects and, directly or through the charging control device (102), cuts off the current passing through the power excitation windings (103) to cause the conductive device (112) to release the clamping force on the rechargeable discharge device (104), and then the rechargeable discharge device (104) disconnects from the conductive device (112) to stop charging; and the above disconnection is implemented by making use of gravity and/or the thrust of the prestressing spring (106).

The embodiment shown in FIG. 5 can be further applied to the rechargeable discharge device (104) with a conductive structure installed on one side.

Figure 6:
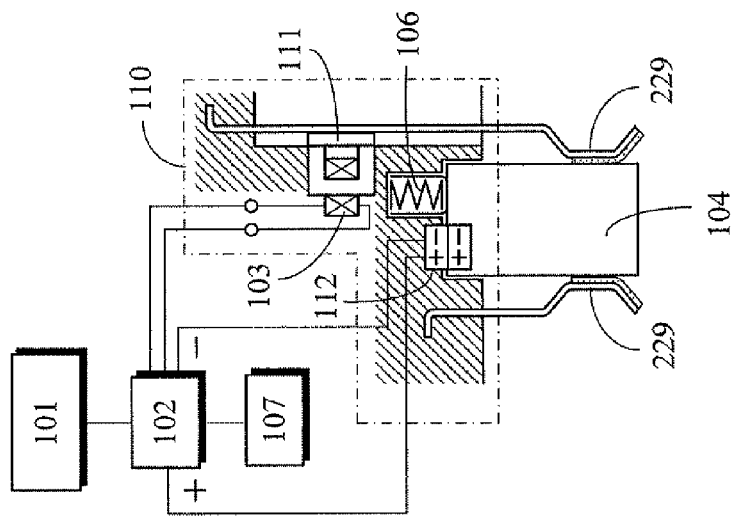
FIG. 6 is a structural drawing showing an embodiment of FIG. 5 applied to the rechargeable discharge device (104) with a conductive structure installed on one side.

FIG. 6 is a structural drawing showing an embodiment of FIG. 5 applied to the rechargeable discharge device (104) with a conductive structure installed on one side. As shown in FIG. 6, the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed therein; the remaining structures and operations are the same as those of the embodiment in FIG. 5.

The power charging device with charge saturation disconnector through electromagnetic force release can further cause the conductive device (112) of the magnetic actuator conductive device (110) to simultaneously have the function of being driven by power excitation like that of the magnetic driving structure (111), and makes use of the prestressing of the conductive device (112) to clamp and charge the rechargeable discharge device (104). The conductive device (112) is driven by the power excitation windings (103) of the magnetic actuator conductive device (110) to release clamping of the rechargeable discharge device (104) to stop charging when charge saturation occurs.

Figure 7:
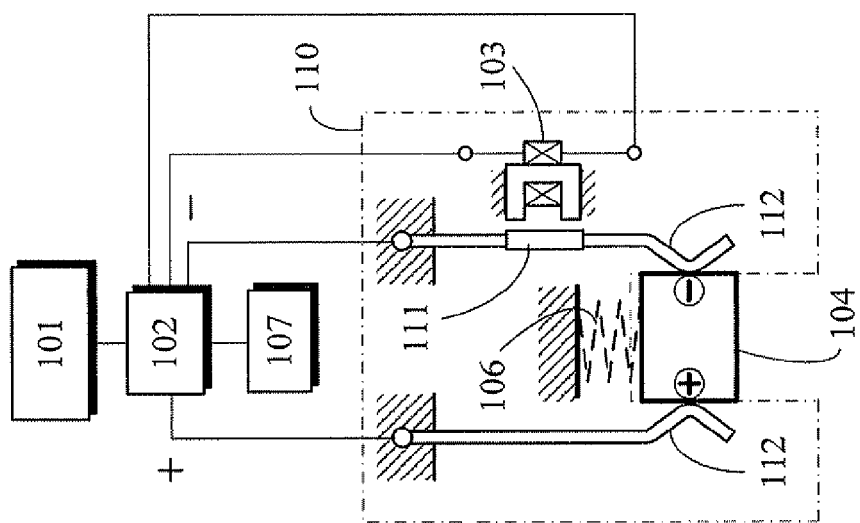
FIG. 7 is a structural drawing showing an embodiment of the power excitation windings (103), wherein the power excitation windings (103) are powered to drive the conductive device (112) of the magnetic actuator conductive device (110), which simultaneously has the functionality of being driven by power excitation like that of the magnetic driving structure (111), for releasing the rechargeable discharge device (104) to stop charging upon charge saturation, according to the present invention.

FIG. 7 is a structural drawing showing an embodiment of the power excitation windings (103), wherein the power excitation windings (103) are powered to drive the conductive device (112) of the magnetic actuator conductive device (110), which simultaneously has the functionality of being driven by power excitation like that of the magnetic driving structure (111), for releasing the rechargeable discharge device (104) to stop charging upon charge saturation, according to the present invention.

As shown in FIG. 7, when the rechargeable discharge device (104) is placed therein, the conductive device (112) clamps and transmits charging energy to the rechargeable discharge device (104) through the prestressing thereof; and the power excitation windings (103) are excited to drive the conductive device (112) of the magnetic actuator conductive device (110), which simultaneously has the functionality of being driven by power excitation like that of the magnetic driving structure (111), for releasing the rechargeable discharge device (104) to stop charging upon charge saturation, wherein the operational functions are the same as those of FIG. 3.

The embodiment as shown in FIG. 7 can further be applied to the rechargeable discharge device (104) with a conductive structure installed on one side.

Figure 8:
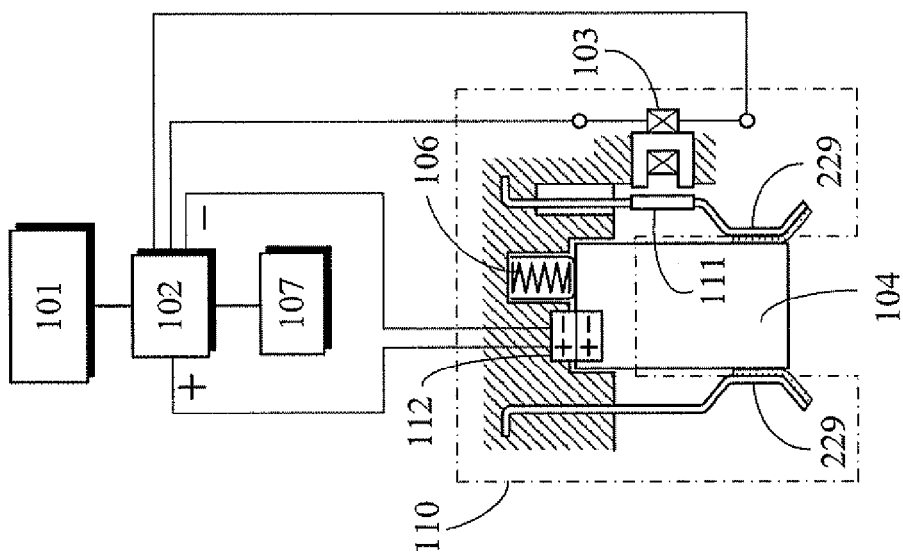
FIG. 8 is a structural drawing showing an embodiment of FIG. 7 applied to the rechargeable discharge device (104) with a conductive structure installed on one side.

FIG. 8 is a structural drawing showing an embodiment of FIG. 7 applied to the rechargeable discharge device (104) with a conductive structure installed on one side. As shown in FIG. 8, the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed therein; the remaining structures and operations are the same as those of the embodiment in FIG. 7.

The power charging device with charge saturation disconnector through electromagnetic force release can further cause the conductive device (112) of the magnetic actuator conductive device (110) to simultaneously have the function of being driven by power excitation like that of the magnetic driving structure (111), and makes use of the excitation current passing through the power excitation windings (103) to drive the conductive device (112) to clamp and charge the rechargeable discharge device (104). Excitation of the power excitation windings (103) is terminated to cause the conductive device (112) to release clamping of the rechargeable discharge device (104) to stop charging when charge saturation occurs.

Figure 9:
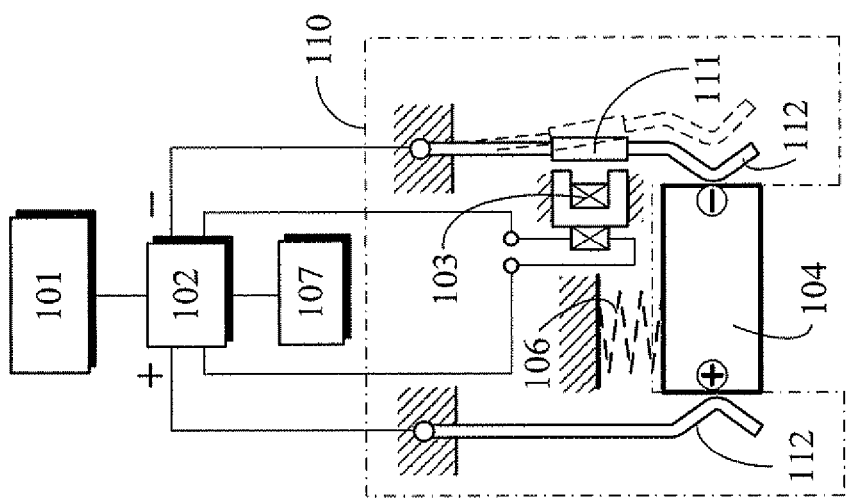
FIG. 9 is a structural drawing showing an embodiment of the power excitation windings (103), wherein the power excitation windings (103) drive the conductive device (112) of the magnetic actuator conductive device (110), which simultaneously have the functionality of being driven by power excitation like that of the magnetic driving structure (111), to clamp the rechargeable discharge device (104) for charging; on the other hand, the powering excitation to the power excitation windings (103) terminates for releasing the rechargeable discharge device (104) from the conductive device (112) to stop charging when charge saturation occurs, according to the present invention.

FIG. 9 is a structural drawing showing an embodiment of the power excitation windings (103), wherein the power excitation windings (103) drives the conductive device (112) of the magnetic actuator conductive device (110), which simultaneously has the functionality of being driven by power excitation like that of the magnetic driving structure (111), to clamp the rechargeable discharge device (104) for charging; on the other hand, excitation of the power excitation windings (103) terminates for releasing the rechargeable discharge device (104) from the conductive device (112) to stop charging when charge saturation occurs, according to the present invention.

As shown in FIG. 9, when the rechargeable discharge device (104) is placed in the conductive device 112, by means of the power excitation windings (103) being excited to drive the conductive device (112), which simultaneously has the functionality of being driven by power excitation, the conductive device (112) clamps and transmits charging energy to the rechargeable discharge device (104); subsequently, excitation of the power excitation windings (103) terminates for releasing the rechargeable discharge device (104) from the conductive device (112) to stop charging when charge saturation occurs, wherein the operational functions are the same as those of FIG. 5.

The embodiment as shown in FIG. 9 can further be applied to the rechargeable discharge device (104) with a conductive structure installed on one side.

Figure 10:
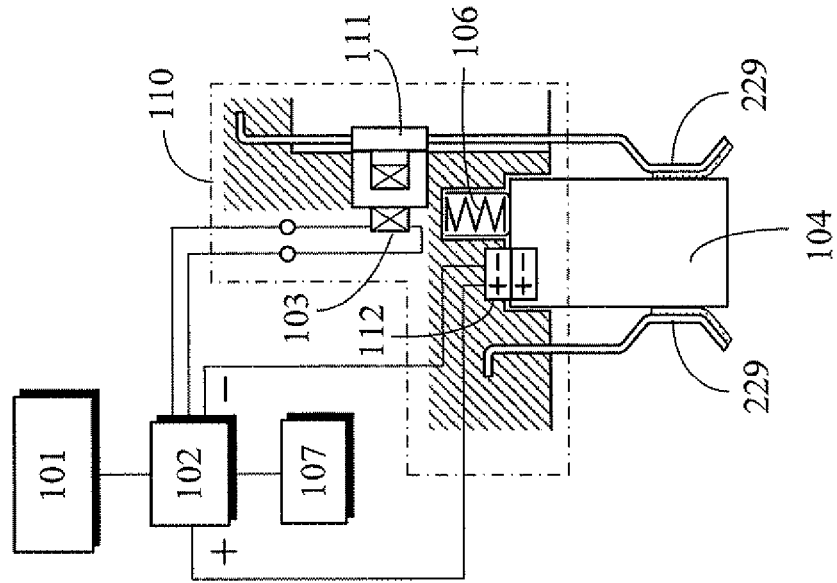
FIG. 10 is a structural drawing showing an embodiment of FIG. 9 applied to the rechargeable discharge device (104) with a conductive structure installed on one side.

FIG. 10 is a structural drawing showing an embodiment of FIG. 9 applied to the rechargeable discharge device (104) with a conductive structure installed on one side. As shown in FIG. 10, the conductive device (112) is installed for coupling with the conductive structure installed on one side of the rechargeable discharge device (104), and clamping structure (229) controlled by the magnetic actuator conductive device (110) is installed for clamping the rechargeable discharge device (104) when the rechargeable discharge device (104) is placed therein; the remaining structures and operations are the same as those of the embodiment in FIG. 9.

The power charging device with charge saturation disconnector through electromagnetic force release can further be installed with a prestressed pushing electromagnetic driving suction device (114), which causes displacement upon being actuated through the charging control device (102) controlling the power excitation current passing through the power excitation windings (103) when the rechargeable discharge device (104) is charged, with the space vacated by the displacement being used for installing the rechargeable discharge device (104). when the rechargeable discharge device (104) is charge saturated, the charging state detection device (107) detects and directly or through the charging control device (102) cuts off the power excitation current passing through the power excitation windings (103), and the prestressing spring (106) is driven to cause the prestressed pushing electromagnetic driving suction device (114) to push the rechargeable discharge device (104) away from the conductive device (112) to stop charging.

Figure 11:
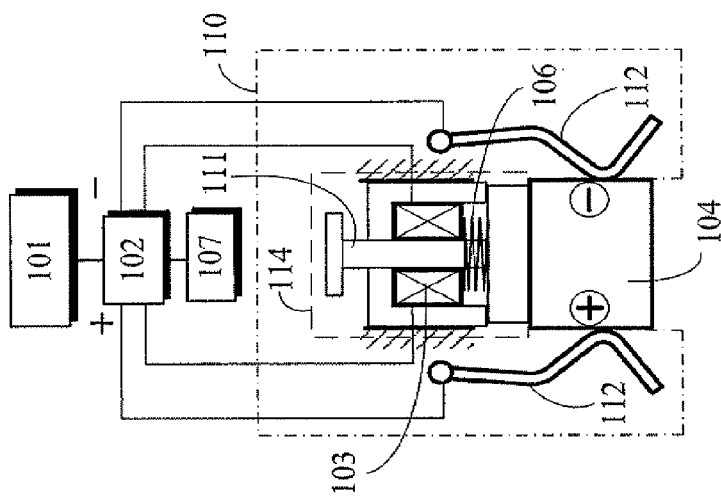
FIG. 11 is a structural drawing showing an embodiment of the power excitation windings (103) driving a prestressing pushed electromagnetic driving suction device (114), according to the present invention.

FIG. 11 is a structural drawing showing an embodiment of the power excitation windings (103) driving the prestressing pushed electromagnetic driving suction device (114), according to the present invention.

As shown in FIG. 11, the main components include:

Charging control device (102): formed by electromechanical or solid state electronic elements, including a microprocessor and software, for receiving input of the charging power supply (101) to output and control the charge voltage and current over the rechargeable discharge device (104), and receiving a signal of the charging state detection device (107) from the rechargeable discharge device (104) to control the excitation timing of the power excitation windings (103); in which the charging control device (102) can be a single circuit device or combined with the power supply (101) to be an integrated structure;

Magnetic actuator conductive device (110): equipped with the conductive device (112) connected with the charging control device (102), and installed with the prestressed pushing electromagnetic driving suction device (114) at the space for installing the rechargeable discharge device (104);

Prestressed pushing electromagnetic driving suction device (114): equipped with the power excitation windings (103) and the prestressing spring (106), and formed of an electromagnetic force driving or spring force reversion mechanism; in which when power is interrupted, by means of the prestressing of the prestressing spring (106), the moving mechanism of the prestressed pushing electromagnetic driving suction device (114) can push the rechargeable discharge device (104) away from the position of the conductive device (112); and when the power excitation windings (103) are excited, the moving mechanism of the prestressed pushing electromagnetic driving suction device (114) can be attracted to move to provide space for placing the rechargeable discharge device (104) to receive charge from the conductive device (112); and Charging state detection device (107): formed by one or more charging state detection devices for detecting the charge saturation state of the rechargeable discharge device (104).

The charging state detection device (107) of the rechargeable discharge device (104) may, by way of example and not limitation:

1) be formed by a terminal voltage detection device provided by the charging state detection device (107), which is installed at positive and negative electrodes of the charging control device (102), the positive and negative electrodes outputting charging energy, or installed at positive and negative electrodes of the rechargeable discharge device (104), wherein the two installation alternatives can each detect a terminal voltage signal when the rechargeable discharge device (104) is charged for determining charge saturation state for the rechargeable discharge device (104); and/or 2) be formed by a detection device for sudden decreased charge saturation voltage, which adopts a terminal voltage detection device as the charging state detection device (107), wherein when the rechargeable discharge device (104) is charge saturated, the terminal voltage decreases suddenly; the terminal voltage detection device can be installed at positive and negative electrodes of the charging control device (102) to output charging energy, or be installed at positive and negative electrodes of the rechargeable discharge device (104), the two installation alternative being arranged to detect the power signal of sudden decreased terminal voltage, when the rechargeable discharge device (104) is charge saturated; and/or 3) form by a charge current detection circuit, which provides a signal of current value when the charge current decreases in charge saturation; and/or 4) be formed by a thermal switch device, which occurs response of switch function when the temperature of the rechargeable discharge device (104) in charge saturation raises to the set value; and/or 5) be formed by an element with a coefficient of resistance related to positive or negative temperature, which undergoes a change of relative resistance value when the temperature of the rechargeable discharge device (104) in charge saturation rises to a set value; and/or 6) be formed by an internal resistance measurement circuit, which detects a signal of relative resistance value when the internal resistance of the rechargeable discharge device (104) in charge saturation undergoes a relative change; and/or 7) be formed by other typical methods and devices which can detect the rechargeable discharge device (104) in charge saturation.

There are one or more functionalities involved in the above operations performed by the charging state detection device (107), including:

1) the charging state detection device (107) of the rechargeable discharge device (104) can directly terminate power excitation to the power excitation windings (103);

2) the detection signal of the charging state detection device (107) is transmitted to the charging control device (102), and then the charging control device (102) cuts off power energy to the power excitation windings (103); and 3) the detection signal of the charging state detection device (107) is transmitted to the charging control device (102), and then the charging control device (102) performs trickling charge to the rechargeable discharge device (104) for a set time delay, or again through the detection signal of the charging state detection device (107), the charging control device (102) cuts off power energy to the power excitation windings (103) to stop excitation.

As mentioned above, the charging state detection device (107) controls the charging control device (102) to cut off power energy to the power excitation windings (103) by means of the prestressing of the prestressing spring (106) pushing the electromagnetic driving suction device (114), causing the rechargeable discharge device (104) to be pushed away from the conductive device (112) to stop charging.

The rechargeable discharge device (104) is formed by a rechargeable alkaline battery, or various rechargeable discharge batteries, or an ultracapacitor or capacitor, and installed within the conductive device (112) of the magnetic actuator conductive device (110) to be clamped in a rechargeable state. When excitation of the power excitation windings (103) of the electromagnetic driving suction device (114) is terminated, or the power excitation current decreases to the a threshold limit value of the prestressing spring (106) of the electromagnetic driving suction device (114), at least one electrode side of the rechargeable discharge device (104) disconnects from the magnetic actuator conductive device (110) to stop charging.

As shown in FIG. 11, the power charging device with charge saturation disconnector through electromagnetic force release can further include a synchronous power switch function, in which a synchronous power switch is installed at a position for interacting with the magnetic actuator conductive device (110); when the rechargeable discharge device (104) is placed in and the magnetic actuator conductive device (110) is forced to move to deform, the synchronous power switch is touched simultaneously to supply power to the rechargeable discharge device (104) for charging. The synchronous power switch is formed by electromechanical or solid state switches to be triggered by one or more of the following triggers: mechanical displacement, photoelectric operation, pressure operation, acoustic operation, static electricity operation, manipulation of magnetic induction, operation of electromagnetic induction, and capacitive sensor operation, any of which may be used for switch functional operations of the power supply in the embodiments described below.

Figure 12:
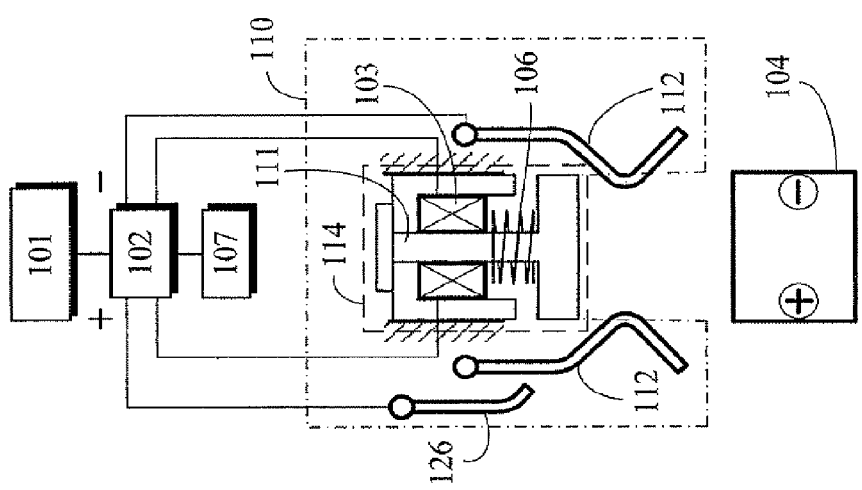
FIG. 12 is a structural drawing showing an embodiment of FIG. 11 equipped with reed contact (126) as a synchronous power switch.

FIG. 12 is a structural drawing showing an embodiment of FIG. 11 equipped with a reed contact (126) as a synchronous power switch.

As shown in FIG. 12, the power charging device with charge saturation disconnector through electromagnetic force release shown in FIG. 11 can further be installed with the reed contact (126) for forming a synchronous operation switch with the conductive device (112) to simultaneously start power when the rechargeable discharge device (104) is placed therein, and to simultaneously cut off power when the rechargeable discharge device (104) disconnects from the conductive device (112).

Figure 13:
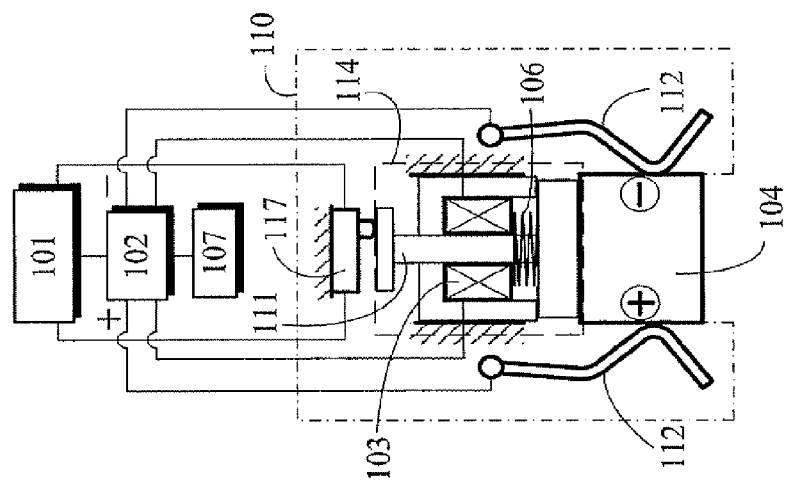
FIG. 13 is a structural drawing showing an embodiment of FIG. 11 equipped with touch switch (limit switch) (117) as a synchronous power switch.

FIG. 13 is a structural drawing showing an embodiment of FIG. 11 equipped with a touch switch (limit switch) (117) as a synchronous power switch.

As shown in FIG. 13, the power charging device with charge saturation disconnector through electromagnetic force release shown in FIG. 11 can further include the touch switch (limit switch) (117) for forming a synchronous operation switch with the conductive device (112) to simultaneously start power when the rechargeable discharge device (104) is placed therein, and to simultaneously cut off power when the rechargeable discharge device (104) disconnects from the conductive device (112).

The embodiments as shown in FIG. 11 to FIG. 13 can further be applied to the rechargeable discharge device (104) with a conductive structure installed on one side.

Figure 14:
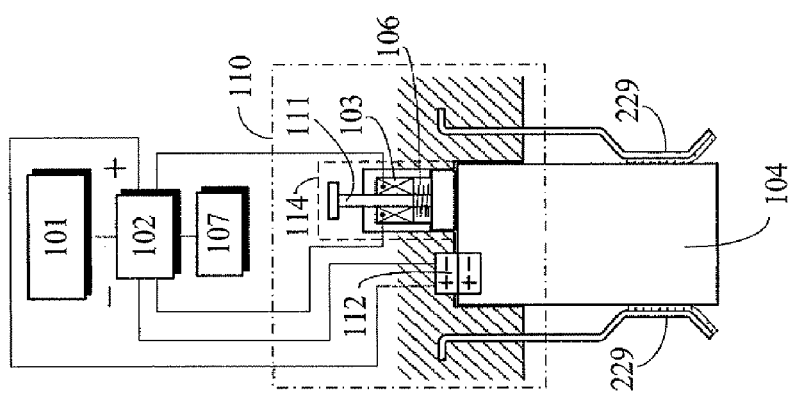
FIG. 14 is a structural drawing showing an embodiment of FIG. 11 applied to the rechargeable discharge device (104) with a conductive structure installed on one side.

FIG. 14 is a structural drawing showing an embodiment of FIG. 11 applied to the rechargeable discharge device (104) with a conductive structure installed on one side. As shown in FIG. 14, the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed therein; the remaining structures and operations are same as those of the embodiment in FIG. 11.

Figure 15:
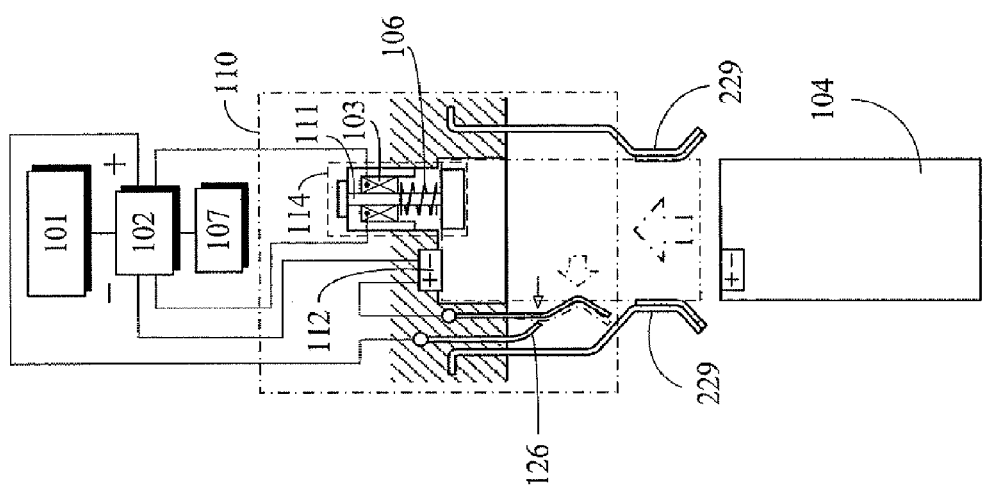
FIG. 15 is a structural drawing showing an embodiment of FIG. 12 applied to the rechargeable discharge device (104) with a conductive structure installed on one side.

FIG. 15 is a structural drawing showing an embodiment of FIG. 12 applied to the rechargeable discharge device (104) with a conductive structure installed on one side. As shown in FIG. 15, the conductive device (112) is installed for coupling with a conductive structure installed on one side of the rechargeable discharge device (104), and the clamping structure (229) controlled by the magnetic actuator conductive device (110), as well as the reed contact (126) installed for forming synchronous operation switch with the conductive device (112), are installed for clamping the rechargeable discharge device (104) when the rechargeable discharge device (104) is placed therein; the remaining structures and operations are same as those of the embodiment in FIG. 12.

Figure 16:
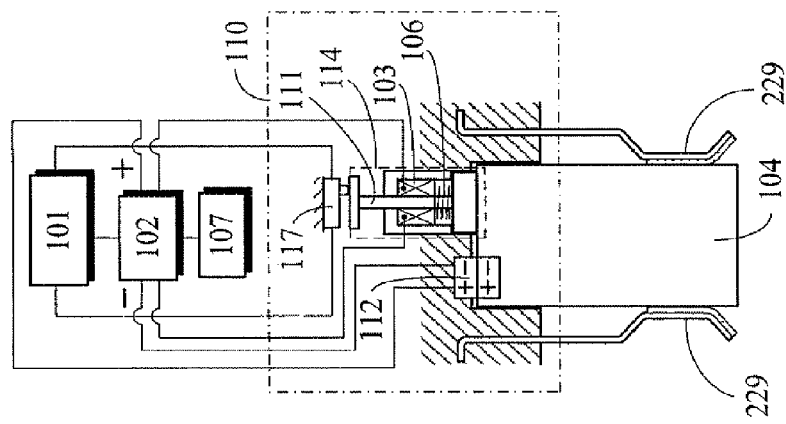
FIG. 16 is a structural drawing showing an embodiment of FIG. 13 equipped with the touch switch (limit switch) (117) as a synchronous power switch.

FIG. 16 is a structural drawing showing an embodiment of FIG. 13 equipped with the touch switch (limit switch) (117) as a synchronous power switch. As shown in FIG. 16, the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed therein; the remaining structures and operations are same as those of the embodiment in FIG. 13.

The power charging device with charge saturation disconnector through electromagnetic force release can further drive a magnetic circuit with iron-core (127) of the magnetic actuator conductive device (110) by means of the charge current passing through the power excitation windings (103). The conductive device (112) then clamps and charges the rechargeable discharge device (104); and the charge current terminates or decreases when charge saturation occurs, whereupon the magnetic actuator conductive device (110) and the conductive device (112) release the clamped rechargeable discharge device (104) for disconnecting from the conductive device (112) to stop charging.

FIG. 17 is a structural drawing showing an embodiment of the power excitation windings (103) with charge current passing through for driving the magnetic actuator conductive device (110) with the functionalities of prestressing release and magnetic clamping, according to the present invention.

As shown in FIG. 17, the main components include:

Charging power supply (101): which may be in the form of a DC charging power supply or a converter for converting power from an AC power supply into DC power;

Charging control device (102): related to a device which can perform one or more of the following operations on the rechargeable discharge device (104), the operations including: 1) manipulating charge time; and/or 2) manipulating charge voltage; and/or 3) manipulating charge current;

Magnetic actuator conductive device (110): equipped with the conductive device (112) connected with the charging control device (102), and installed with an electromagnetic actuator (124) in the space for installing the rechargeable discharge device (104); in which the electromagnetic actuator (124) includes the power excitation windings (103), the magnetic circuit with iron-core (127), the magnetic driving structure (111), the magnetic circuit with iron-core (127), the conductive device (112), and the prestressing homing spring (116), for attracting the magnetic driving structure (111) when the power excitation windings (103) are powered, to cause the conductive device (112) which is integrated with the magnetic driving structure (111), to clamp the rechargeable discharge device (104), and to charge the rechargeable discharge device (104); and when the current passing through the power excitation windings (103) decreases or terminates, the magnetic driving structure (111) returns to the original position through the prestressing of the prestressing homing spring (116), and then the conductive device (112) releases the clamped rechargeable discharge device (104); and Parallel shunt circuit device (120): formed by electromechanical or electronic circuit elements, or solid state power components, connected in parallel to two sides of the power excitation windings (103), for controlling the value of the current passing through the power excitation windings (103), and further controlling the disconnecting timing for the magnetic actuator conductive device (110); however, if all charge current is adopted to be the power excitation current to the magnetic actuator conductive device (110), the parallel shunt circuit device (120) should not be installed.

The above power energy of the charging power supply (101) can, directly or through the charging control device (102), pass through the power excitation windings (103), and then all or part of the current passing through the power excitation windings (103) passes through the rechargeable discharge device (104) via the conductive device (112) to charge the rechargeable discharge device (104).

When the rechargeable discharge device (104) is positioned to cause charge current to pass through the power excitation windings (103), the electromagnetic actuator (124) is attracted by the excitation to drive the magnetic driving structure (111) of the magnetic actuator conductive device (110) and the conductive device (112), which is integrated with the magnetic driving structure (111), to produce the clamping force and conductive functionality for the rechargeable discharge device (104).

When the rechargeable discharge device (104) is charged, the voltage thereof gradually rises, and then the charge current decreases and further causes the current passing through the power excitation windings (103) to decrease, or when the current passing through the power excitation windings (103) terminates through the control of the charging control device (102), the excitation of electromagnetic actuator (124) is terminated, and by means of the prestressing of the prestressing homing spring (116), the magnetic driving structure (111) and the conductive device (112), which is integrated with the magnetic driving structure (111), release the clamped rechargeable discharge device (104).

The embodiment as shown in FIG. 17 can further be installed with the prestressing spring (106), so that when the current passing through the power excitation windings (103) decreases to the threshold limit value or terminates, the magnetic driving structure (111) and the conductive device (112), which are integrated with the magnetic driving structure (111), can release the clamped rechargeable discharge device (104), and push the rechargeable discharge device (104) away from the conductive device (112) to stop charging.

FIG. 18 is a structural drawing showing an embodiment of the magnetic actuator conductive device (110) of FIG. 17 equipped with prestressing spring (106).

As shown in FIG. 18, the main components are the same as those in FIG. 17, and the further characteristics are that the prestressing spring (106) is installed at the space within the conductive device (112) for installing the rechargeable discharge device (104). When the current passing through the power excitation windings (103) decreases to the threshold limit value or terminates, the magnetic driving structure (111) and the conductive device (112) integrated with the magnetic driving structure (111) can release the clamped rechargeable discharge device (104), and the prestressing spring (106) pushes the rechargeable discharge device (104) to disconnect from the conductive device (112).

As shown in FIGS. 17 and 18, the power charging device with charge saturation disconnector through electromagnetic force release can further adopt the pitch status between the two conductive devices (112) as the positive and negative electrodes, in which the above pitch is more than the pitch between two electrodes of the rechargeable discharge device (104) before charging, but after the rechargeable discharge device (104) is placed therein, the two conductive devices (112) that form the positive and negative electrodes are pushed close through the start structure driven by external force to contact with the positive and negative electrodes of the rechargeable discharge device (104), and then the rechargeable discharge device (104) is charged by the charging power supply via the two conductive devices (112) forming the positive and negative electrodes. The power excitation windings (103) are excited simultaneously through the charge current to attract the magnetic driving structure (111), and then the conductive device (112) integrated with the magnetic driving structure (111) clamps and charges the rechargeable discharge device (104) continuously.

FIG. 19 is a structural drawing showing an embodiment including a press type boot structure (231) for activating the charging function, according to the present invention.

As shown in FIG. 19, the main components include:
Charging power supply (101): which may be a DC charging power supply AC-DC converter connected to an AC power supply;
Charging control device (102): related to a device which can perform one or more of the following operations on the rechargeable discharge device (104): 1) manipulating charge time; and/or 2) manipulating charge voltage; and/or 3) manipulating charge current; and
Magnetic actuator conductive device (110): equipped with the conductive device (112) connected with the charging control device (102), in which the conductive device (112) and the magnetic driving structure (111) are integrated, and the pitch between the two conductive devices (112) forming the positive and negative electrodes is more than the pitch between two electrodes of the rechargeable discharge device (104). After the positioning ring structure (105) is placed in the rechargeable discharge device (104), press type boot structure (231) is driven by external force, and the two conductive devices (112) forming the positive and negative electrodes are pushed close to conduct with the positive and negative electrodes of the rechargeable discharge device (104) so that charging power is supplied to the rechargeable discharge device (104) via the two conductive devices (112), and the power excitation windings (103) are excited simultaneously, so that the electromagnetic actuator (124) attracts the magnetic driving structure (111), and the conductive device (112) integrated with the magnetic driving structure (111) is forced to clamp the rechargeable discharge device (104) continuously, and to charge the rechargeable discharge device (104). When the current passing through the power excitation windings (103) decreases to the threshold limit value or terminates, by means of the prestressing of the prestressing homing spring (116), the magnetic driving structure (111) and the conductive device (112) integrated with the magnetic driving structure (111) can release the clamped rechargeable discharge device (104) and stop charging.

As shown in FIG. 17 to FIG. 19, if the conductive device and the clamping structure are separate structures installed at different positions, such as conductive device (112) and clamping structure (229), in which the conductive device (112) for transmitting the charge power energy is installed against the direction for installing the conductive device (112), and the clamping structure (229) is the same structure to only have the clamping functionality for clamping the side of the rechargeable discharge device (104), then when the rechargeable discharge device (104) is place therein, the charging power supply can power the rechargeable discharge device (104), and the power excitation windings (103) are excited to cause the electromagnetic actuator (124) to clamp the rechargeable discharge device (104). Subsequently, when the current passing through the power excitation windings (103) decreases or terminates, by means of the prestressing of the prestressing homing spring (116), the magnetic driving structure (111) and the conductive device (112) integrated with the magnetic driving structure (111) release the clamped rechargeable discharge device (104).

The embodiments as shown in FIG. 17 to FIG. 19 can further be applied to the rechargeable discharge device (104) with a conductive structure installed on one side.

Figure 20:
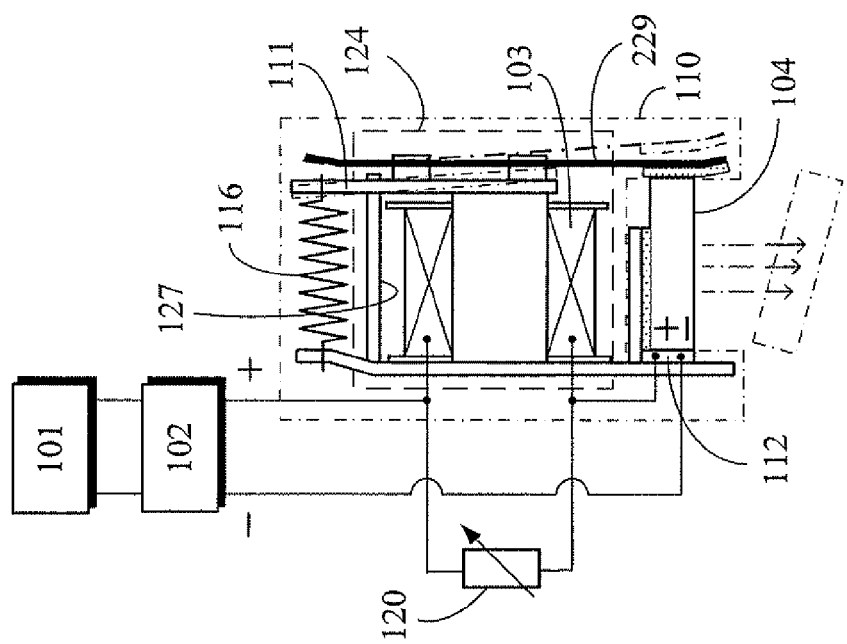
FIG. 20 is a structural drawing showing an embodiment of FIG. 17 applied to the rechargeable discharge device (104) with a conductive structure installed on one side.

FIG. 20 is a structural drawing showing an embodiment of FIG. 17 applied to the rechargeable discharge device (104) with a conductive structure installed on one side. As shown in FIG. 20, the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed therein; the remaining structures and operations are the same as those of the embodiment in FIG. 17.

Figure 21:
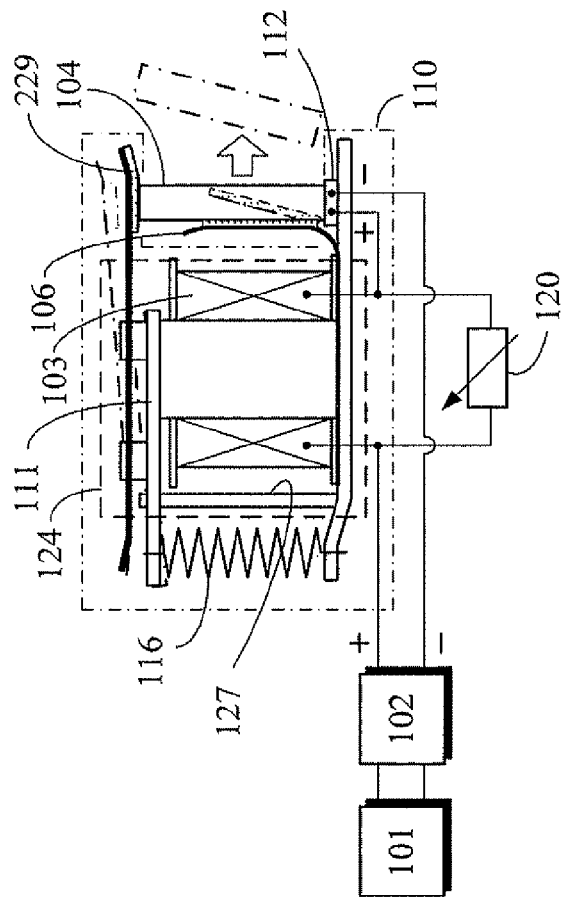
FIG. 21 is a structural drawing showing an embodiment of FIG. 18 applied to the rechargeable discharge device (104) with a conductive structure installed on one side.

FIG. 21 is a structural drawing showing an embodiment of FIG. 18 applied to the rechargeable discharge device (104) with conductive structure installed on one side. As shown in FIG. 21, the conductive device (112) is installed for coupling with the conductive structure installed on one side of the rechargeable discharge device (104), the clamping structure (229) controlled by the magnetic actuator conductive device (110) is installed for clamping the rechargeable discharge device (104) when the rechargeable discharge device (104) is placed therein, and the prestressing spring (106) is installed for pushing the rechargeable discharge device (104). After the clamping structure (229) releases the clamped rechargeable discharge device (104) upon charge saturation, the rechargeable discharge device (104) is pushed to disconnect from the conductive device (112) through the prestressing spring (106); the remaining structures and operations are the same as those of the embodiment in FIG. 18.

Figure 22:
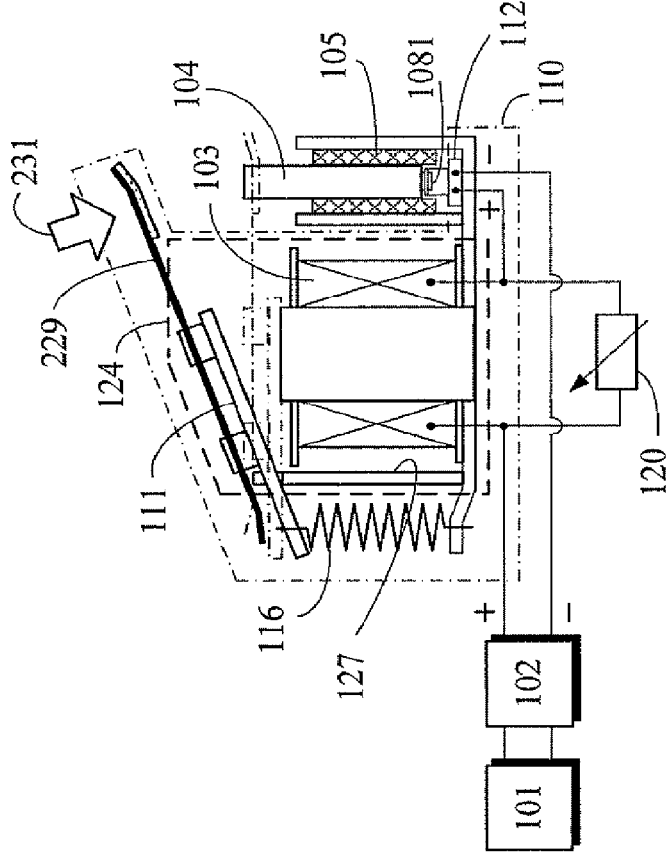
FIG. 22 is a structural drawing showing an embodiment of FIG. 19 applied to the rechargeable discharge device (104) with a conductive structure installed on one side.

FIG. 22 is a structural drawing showing an embodiment of FIG. 19 applied to the rechargeable discharge device (104) with a conductive structure installed on one side. As shown in FIG. 22, the conductive device (112) is installed for coupling with the conductive structure installed on one side of the rechargeable discharge device (104), and prestressing reed (108) is installed between the conductive device (112) and the rechargeable discharge device (104), in which the prestressing reed (108) is an elastic structure and the prestressing, which is normally along the direction for pushing the rechargeable discharge device (104) away to stop charging, is less than the clamping force of the clamping structure (229), but more than the weight of the rechargeable discharge device (104). The prestressing reed (108) is equipped with a relay conductive structure (1081) for transmitting the power energy of the positive and negative electrodes of the conductive device (112) to the positive and negative electrodes of the rechargeable discharge device (104). If the prestressing reed (108) is made of insulative material, than the relay conductive structure (1081) can be directly installed on the prestressing reed (108), and if the prestressing reed (108) is made of conductive material, than an additional insulator is required between the relay conductive structure (1081) and the prestressing reed (108). When the rechargeable discharge device (104) is placed therein, through the operation of the press type boot structure (231), the clamping structure (229) controlled by the magnetic actuator conductive device (110) can clamp the rechargeable discharge device (104), and force the prestressing reed (108) to move. Then, the power energy of the conductive device (112) is transmitted to the rechargeable discharge device (104) for charging via the relay conductive structure (1081) installed on the prestressing reed (108), and because the power excitation windings (103) is powered excitation, the clamping structure (229) clamps the rechargeable discharge device (104) continuously. When charge saturation occurs, the clamping structure (229) disconnects and releases the clamped rechargeable discharge device (104) and, by means of the prestressing of the prestressing reed (108), the rechargeable discharge device (104) disconnects from the conductive device (112) to stop charging; the remaining structures and operations are same as those of the embodiment in FIG. 19.

Figure 23:
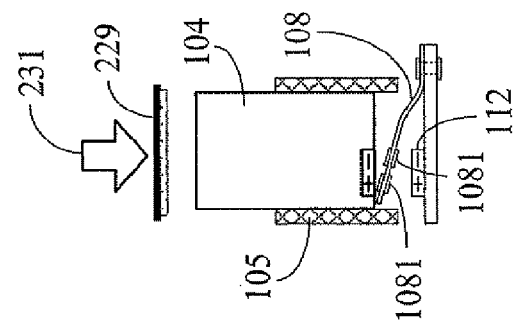
FIG. 23 is a schematic view showing a disconnected state among the rechargeable discharge device (104), the prestressing reed (108), and the conductive device (112) in the embodiment of FIG. 22.

FIG. 23 is a schematic view showing a disconnected state among the rechargeable discharge device (104), the prestressing reed (108), and the conductive device (112) in the embodiment of FIG. 22.

Figure 24:
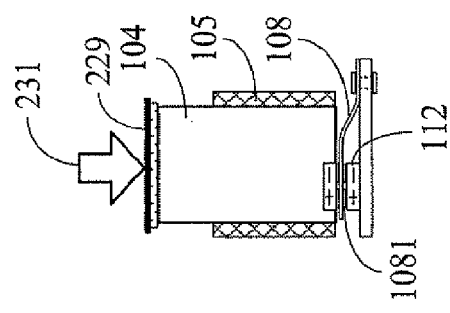
FIG. 24 is a schematic view showing a conductive state among the rechargeable discharge device (104), the prestressing reed (108), and the conductive device (112) in the embodiment of FIG. 22.

FIG. 24 is a schematic view showing a conductive state among the rechargeable discharge device (104), the prestressing reed (108), and the conductive device (112) in the embodiment of FIG. 22.

The power charging device with charge saturation disconnector through electromagnetic force release can further be installed with a electromagnetic driving transposition mechanism (115) within the magnetic actuator conductive device (110). The electromagnetic driving transposition mechanism (115) is installed for pushing the rechargeable discharge device (104) away from the position of the magnetic actuator conductive device (110). When the rechargeable discharge device (104) is charge saturated, the power excitation windings (103) drive the electromagnetic driving transposition mechanism (115) for pushing the rechargeable discharge device (104) away from the magnetic actuator conductive device (110).

Figure 25:
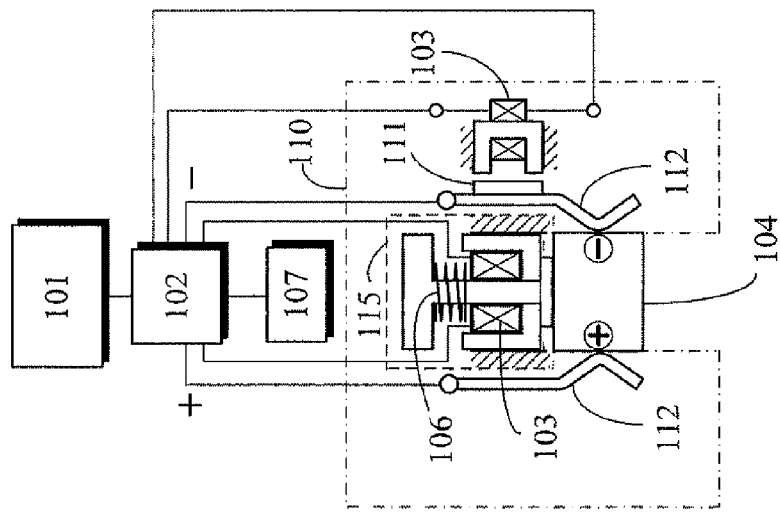
FIG. 25 is a structural drawing showing an embodiment of the power excitation windings (103) for driving the magnetic actuator conductive device (110) of an electromagnetic driving transposition mechanism, according to the present invention.

FIG. 25 is a structural drawing showing an embodiment of the power excitation windings (103) driving the magnetic actuator conductive device (110) of electromagnetic driving transposition mechanism, according to the present invention.

As shown in FIG. 25, the operational functionality of the power charging device with charge saturation disconnector through electromagnetic force release is that when the rechargeable discharge device (104) is installed within the magnetic actuator conductive device (110), the rechargeable discharge device (104) is clamped and charged by the conductive device (112), and when the rechargeable discharge device (104) is charge saturated, the charging state detection device (107) used for detecting the charging state for the rechargeable discharge device (104) can perform one or more of the following operational functions, including:

1) the power excitation windings (103) can be directly controlled by the charge saturation detection device (107) to be conductive or disconnect to cause the magnetic driving structure (111) to be displaced, and the electromagnetic driving transposition mechanism (115) may be driven simultaneously to push on the rechargeable discharge device (104) to push the rechargeable discharge device (104) away when the conductive device (112) of the magnetic actuator conductive device (110) releases the clamped rechargeable discharge device (104);

2) a signal of the charge saturation detection device (107) is transmitted to the charging control device (102) to control the power excitation windings (103) to be conductive or disconnect to cause the magnetic driving structure (111) to be displaced, and the electromagnetic driving transposition mechanism (115) is driven simultaneously to push the rechargeable discharge device (104) so that it is pushed away when the conductive device (112) of the magnetic actuator conductive device (110) releases the clamped rechargeable discharge device (104);

3) the charging control device (102) performs trickling charge to the rechargeable discharge device (104) for a set time delay, and then the charging control device (102) is driven to control the power excitation windings (103) to be conductive or disconnect to displace the magnetic driving structure (111), and the electromagnetic driving transposition mechanism (115) is driven simultaneously to push on the rechargeable discharge device (104), whereupon the conductive device (112) of the magnetic actuator conductive device (110) releases the clamped rechargeable discharge device (104);

4) the signal of the charge saturation detection device (107) is transmitted to the charging control device (102) to reduce the charge current to the rechargeable discharge device (104) while waiting for the detection charge saturation signal of the charge saturation detection device (107) to further drive the charging control device (102) to control the power excitation windings (103) to be conductive or disconnect cause the magnetic driving structure (111) to be displaced, at which time the electromagnetic driving transposition mechanism (115) is driven simultaneously to push the rechargeable discharge device (104) and the conductive device (112) of the magnetic actuator conductive device (110) releases the clamped rechargeable discharge device (104) to implement two-stage charging; and 5) the detection charge saturation signal of the charging state detection device (107) repeatedly controls the charging control device (102) to gradually reduce the charge current to the rechargeable discharge device (104), and finally the charging control device (102) is controlled to drive the power excitation windings (103) to be conductive or disconnect to cause the magnetic driving structure (111) to be displaced for pushing the conductive device (112), and when the power excitation windings (103) is excited, the electromagnetic driving transposition mechanism (115) is driven to simultaneously push the rechargeable discharge device (104) and disconnect at least one electrode side of the rechargeable discharge device (104) from the conductive device (112) to stop charging.

As shown in FIG. 25, the power charging device with charge saturation disconnector through electromagnetic force release can further add a synchronous power switch function, in which a synchronous power switch is installed at a position for interacting with the magnetic actuator conductive device (110). When the rechargeable discharge device (104) is placed therein and the magnetic actuator conductive device (110) is forced to move to deform, the synchronous power switch is touched simultaneously to cause the power supply to power the rechargeable discharge device (104) for charging. The synchronous power switch is formed by electromechanical or solid state switches for switch trigger operations, including: trigger by mechanical displacement, photoelectric operation, pressure operation, acoustic operation, static electricity operation, manipulation of magnetic induction, operation of electromagnetic induction, and capacitive sensor operation.

Figure 26:
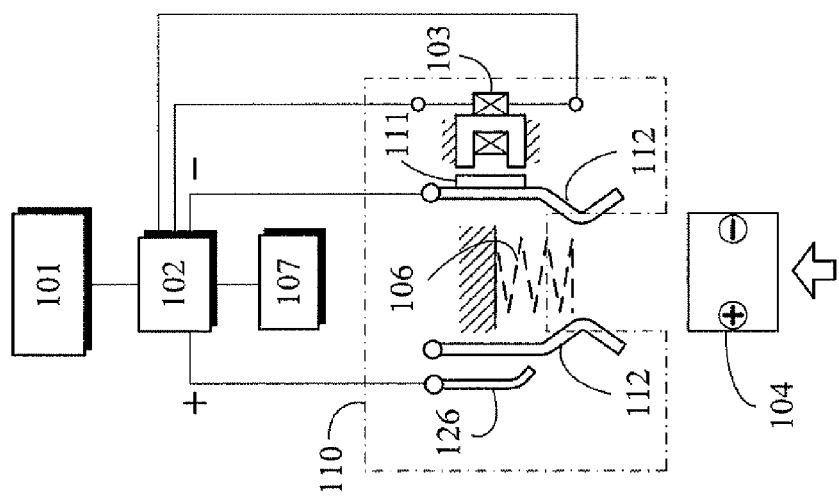
FIG. 26 is a structural drawing showing an embodiment of FIG. 25 equipped with the reed contact (126) as a synchronous power switch.

FIG. 26 is a structural drawing showing an embodiment of FIG. 25 equipped with the reed contact (126) as a synchronous power switch.

As shown in FIG. 26, the reed contact (126) is installed for forming the conductive contact of a synchronous operational switch with the conductive device (112) such that when the rechargeable discharge device (104) is installed, or the reed of the magnetic actuator conductive device (110) is displaced, the charging power supply can be driven to change from disconnection (off) to power (on).

Figure 27:
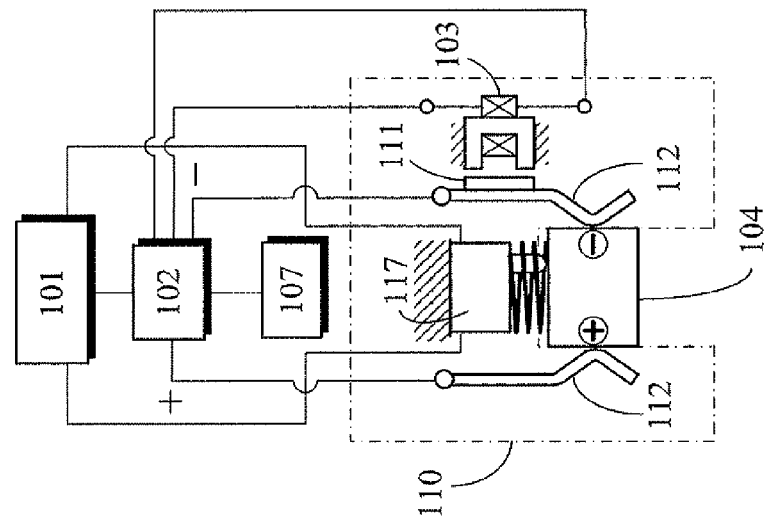
FIG. 27 is a structural drawing showing an embodiment of FIG. 25 equipped with the touch switch (limit switch) (117) as a synchronous power switch.

FIG. 27 is a structural drawing showing an embodiment of FIG. 25 equipped with the touch switch (limit switch) (117) as a synchronous power switch.

As shown in FIG. 27, the synchronous power switch is formed by the touch switch (limit switch) (117), which is installed at a position when the rechargeable discharge device (104) is placed therein, such that by means of the installation of the rechargeable discharge device (104), or the displacement of the reed of the magnetic actuator conductive device (110), the charging power supply can be driven to change from disconnection (off) to power (on).

The embodiments as shown in FIG. 25 to FIG. 27 can further be applied to the rechargeable discharge device (104) with a conductive structure installed on one side.

Figure 28:
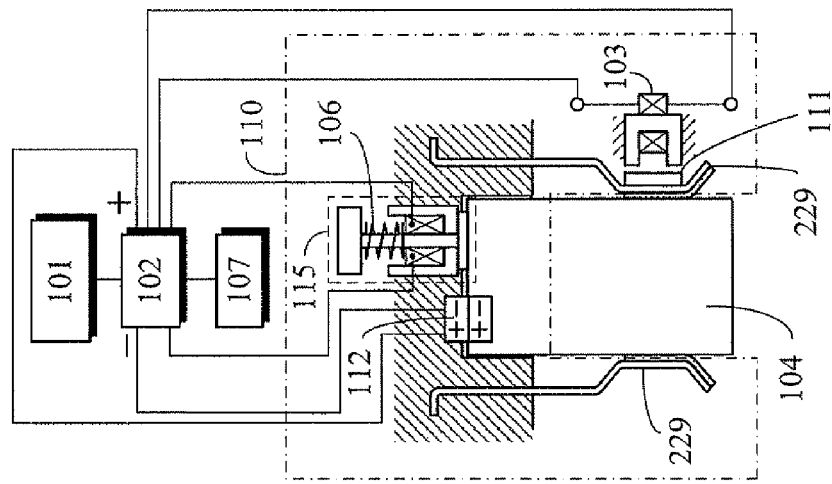
FIG. 28 is a structural drawing showing an embodiment of FIG. 25 applied to the rechargeable discharge device (104) with a conductive structure installed on one side.

FIG. 28 is a structural drawing showing an embodiment of FIG. 25 applied to the rechargeable discharge device (104) with a conductive structure installed on one side. As shown in FIG. 28, the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed therein; the remaining structures and operations are the same as those of the embodiment in FIG. 25.

Figure 29:
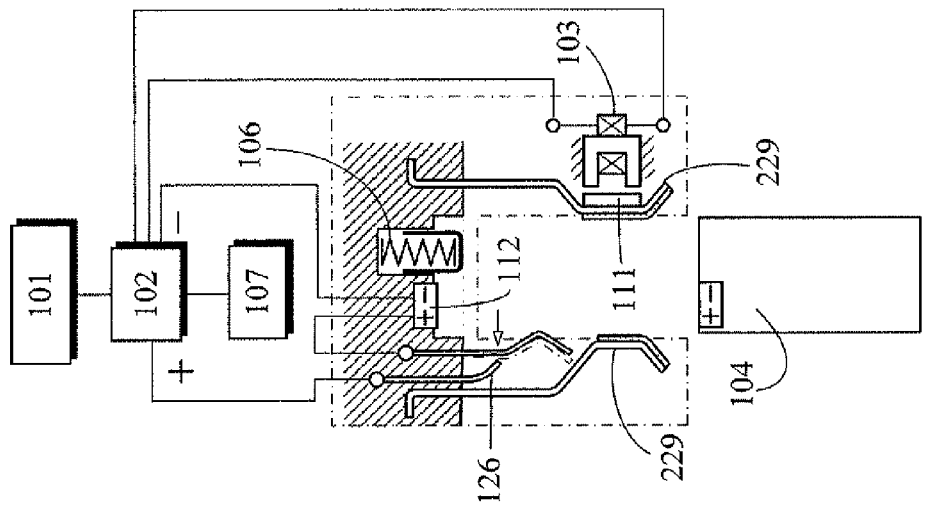
FIG. 29 is a structural drawing showing an embodiment of FIG. 26 applied to the rechargeable discharge device (104) with a conductive structure installed on one side.

FIG. 29 is a structural drawing showing an embodiment of FIG. 26 applied to the rechargeable discharge device (104) with a conductive structure installed on one side. As shown in FIG. 29, the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed therein; the remaining structures and operations are the same as those of the embodiment in FIG. 26.

Figure 30:
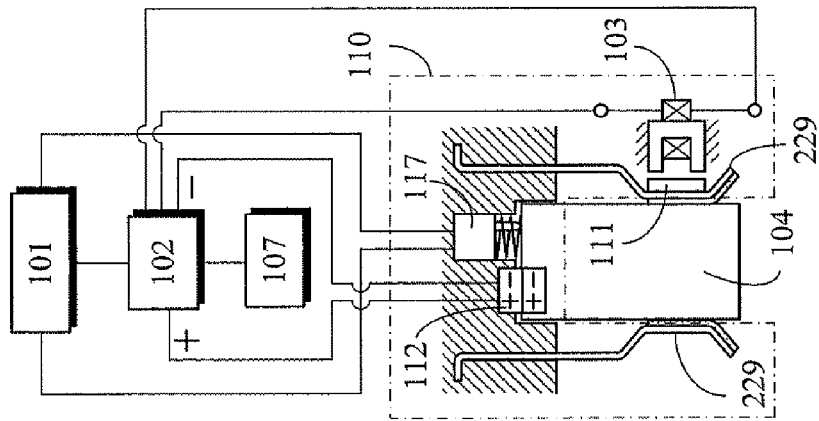
FIG. 30 is a structural drawing showing an embodiment of FIG. 27 applied to the rechargeable discharge device (104) with a conductive structure installed on one side.

FIG. 30 is a structural drawing showing an embodiment of FIG. 27 applied to the rechargeable discharge device (104) with a conductive structure installed on one side. As shown in FIG. 30, the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed therein; the remaining structures and operations are same as those of the embodiment in FIG. 27.

The invention claimed is:

1. A power charging device with a charge saturation disconnector utilizing electromagnetic force release, which is formed by a charging power supply, a charging control device, a magnetic actuator conductive device, power excitation windings, a rechargeable discharge device, and a charge state detection device for detection of the charge situation of the rechargeable discharge device; in which the power charging device with charge saturation disconnector utilizing electromagnetic force release supplies power from the charging power supply (101) to the charging control device (102), and then under the control of the charging control device (102), transmits the power to the magnetic actuator conductive device (110) for charging the rechargeable discharge device (104), which has been clamped by conductive device (112) installed within the magnetic actuator conductive device (110), wherein:

the charging control device (102) is formed by electromechanical or solid state electronic elements including a microprocessor and software, for receiving power input from the charging power supply (101) to output and control a charging voltage and current supplied to the rechargeable discharge device (104), and receiving a signal from the charging state detection device (107) to control the excitation timing of the power excitation windings (103); wherein the charging control device (102) is a single circuit device or combines with the power supply (101) to be an integrated structure;

power excitation windings (103) are formed by elements or a device which converts input power energy to magnetic energy, and installed within the magnetic actuator conductive device (110), or placed at a position where the power excitation windings (103) interact with the magnetic actuator conductive device (110); wherein the power excitation windings (103) are directly controlled by the charging state detection device (107) or by the charging control device (102) to be in a conductive excitation state or to disconnect to displace the magnetic driving structure (111) for releasing the rechargeable discharge device (104) clamped by the conductive device (112) of the magnetic actuator conductive device (110), the rechargeable discharge device (104) being further disconnected by at least one disconnection force provided by a release structural unit (1060), by gravity displacement, by a prestressing device operates by magnetic force, current force, or mechanical force, by a prestressing spring, or by an electromagnetic driving transposition mechanism; wherein by means of said at least one disconnection force, at least one electrode side of the rechargeable discharge device (104) disconnects from the conductive device (112) to stop the charging;

the rechargeable discharge device (104) and conductive device (112) of the magnetic actuator conductive device (110) have a relative position relationship such that the rechargeable discharge device (104) is clamped by the conductive device (112) when the rechargeable discharge device (104) is installed in the conductive device, and both the rechargeable discharge device and conductive device present a conductive state with a same polarity for receiving charging energy; and charging state detection device (107) is installed in at least one of the following positions: within the rechargeable discharge device (104); within the near rechargeable discharge device (104); in a position linking the electrode side of the rechargeable discharge device (104); and in a position linking the output side of the charging power supply of the charging control device (102) to transmit the charging state detection signal;

wherein the charging state detection device (107) of the rechargeable discharge device (104) includes one of the following detection devices:
  a) a terminal voltage detection device installed at positive and negative electrodes of the charging control device (102) or at positive and negative electrodes of the rechargeable discharge device (104), so as to detect a terminal voltage signal of the rechargeable discharge device (104) when the rechargeable discharge device (104) is charged, for determining the charge saturation state of the rechargeable discharge device (104);
  b) a detection circuit for detecting a suddenly decreased charge saturation voltage that occurs when the rechargeable discharge device (104) is charge saturated and the terminal voltage decreases suddenly; the detection circuit being installed at positive and negative electrodes of the charging control device (102) or at positive and negative electrodes of the rechargeable discharge device (104);
  c) a charge current detection circuit, which provides a signal of current value when the charge current decreases at charge saturation;
  d) formed by thermal switch device, which occurs response of switch function when the temperature of the rechargeable discharge device (104) in charge saturation raises to the set value;
  e) an element with a coefficient of resistance related to positive or negative temperature, which undergoes a change in relative resistance value when the temperature of the rechargeable discharge device (104) in charge saturation rises to a set value;
  f) an internal resistance measurement circuit, which detects a relative resistance value when an internal resistance of the rechargeable discharge device (104) in charge saturation undergoes a relative change; and
  g) other methods and devices which detect that the rechargeable discharge device (104) in charge saturation; and wherein when the rechargeable discharge device (104) is charge saturated, at least one of the following operations is performed:
  a) the power excitation windings (103) are directly controlled by the charge saturation detection device to be conductive or disconnect to cause the magnetic driving structure (111) to be displaced for releasing the rechargeable discharge device (104) clamped by the conductive device (112);
  b) a signal is transmitted from the charge saturation detection device (107) to the charging control device (102) to control the power excitation windings (103) to be conductive or disconnected to cause displacement of the magnetic driving structure (111) for releasing the rechargeable discharge device (104) clamped by the conductive device (112);
  c) a signal from the charge saturation detection device (107) is transmitted to the charging control device (102), and the charging control device (102) performs a trickling charge to the rechargeable discharge device (104) for a set time delay, and then the charging control device (102) is driven to control the power excitation windings (103) to be conductive or disconnect to cause the magnetic driving structure (111) to be displaced for releasing the rechargeable discharge device (104) clamped by the conductive device (112);
  d) the signal of the charge saturation detection device (107) is transmitted to the charging control device (102) to reduce the charge current to the rechargeable discharge device (104) while waiting for the detection charge saturation signal of the charge saturation detection device (107), the charge saturation signal further driving the charging control device (102) to control the power excitation windings (103) to be conductive or disconnect cause the magnetic driving structure (111) to be displaced for releasing the rechargeable discharge device (104) clamped by the conductive device (112) to implement two-stage charging; and e) the detection charge saturation signal of the charging state detection device (107) repeatedly controls the charging control device (102) to gradually reduce the charge current to the rechargeable discharge device (104), and finally the charging control device (102) is controlled to drive the power excitation windings (103) to be conductive or disconnect and cause the magnetic driving structure (111) to be displaced for releasing the rechargeable discharge device (104) clamped by the conductive device (112).

2. The power charging device with charge saturation disconnector through electromagnetic force release as claimed in claim 1, wherein when the power charging device with charge saturation disconnector through electromagnetic force release is charge saturated, release of the rechargeable discharge device (104) and termination of charging by the conductive device (112) of the magnetic actuator conductive device (110) is accomplished in one of the following ways:

a) when the state of the magnetic actuator conductive device (110) changes from clamping to releasing, at least one electrode side of the rechargeable discharge device (104) disconnects from the conductive device (112) of the magnetic actuator conductive device (110) through gravity to stop charging; and/or b) a prestressing spring (106) is pressurized to be in a prestressed state when the rechargeable discharge device (104) is placed in the conductive device (112), and when the rechargeable discharge device (104) is charge saturated, the conductive device (112) of the magnetic actuator conductive device (110) releases the rechargeable discharge device (104) through the prestressing of the prestressing spring (106) to cause at least one electrode side of the rechargeable discharge device (104) to be pushed away from the conductive device (112) of the magnetic actuator conductive device (110) along the direction of the prestressing of the prestressing spring (106) to stop charging; wherein the pushed direction is along the gravity direction of the rechargeable discharge device (104) itself, the anti-gravity direction of the rechargeable discharge device (104) itself, or another direction;

c) when the rechargeable discharge device (104) is charge saturated, at least one electrode side of the rechargeable discharge device (104) is pushed to disconnect from the conductive device (112) of the magnetic actuator conductive device (110) through the thrust of a electromagnetic driving transposition mechanism (115) along the gravity direction of the rechargeable discharge device (104) itself, the anti-gravity direction of the rechargeable discharge device (104) itself, or another direction.

3. The power charging device with charge saturation disconnector through electromagnetic force release as claimed in claim 1, wherein the conductive device (112) is installed for coupling with the conductive structure installed on one side of the rechargeable discharge device (104), and a clamping structure (229) controlled by the magnetic actuator conductive device (110) is installed for clamping the rechargeable discharge device (104) when the rechargeable discharge device (104) is placed in the clamping structure (229).

4. The power charging device with charge saturation disconnector through electromagnetic force release as claimed in claim 1, wherein the magnetic actuator conductive device (110) is powered by excitation to cause at least one electrode side of the rechargeable discharge device (104) to disconnect from the magnetic actuator conductive device (110) to stop charging and rechargeable discharge device (104) is formed by a rechargeable alkaline battery, rechargeable discharge battery, ultracapacitor, or capacitor.

5. The power charging device with charge saturation disconnector through electromagnetic force release as claimed in claim 1, wherein the conductive device (112) is installed for coupling with the conductive structure installed on one side of the rechargeable discharge device (104), and clamping structure (229) controlled by the magnetic actuator conductive device (110) is installed for clamping the rechargeable discharge device (104) when the rechargeable discharge device (104) is placed in the conductive device (112).

6. The power charging device with charge saturation disconnector through electromagnetic force release as claimed in claim 1, wherein the power excitation windings (103) drive the magnetic actuator conductive device (110) with the functionalities of prestressing release and magnetic clamping; the rechargeable discharge device (104) is clamped by a pressurized clamping force when the rechargeable discharge device (104) is placed in the conductive device (112); the charging control device (102) senses output of the charge current to the rechargeable discharge device (104), the charging control device (102) causes excitation of the power excitation windings (103) to attract the magnetic driving structure (111) and cause the conductive device (112) to pressurize for clamping the rechargeable discharge device (104) to prevent release of the rechargeable discharge device (104) from the conductive device (112), and the conductive device (112) transmits charging energy to the rechargeable discharge device (104); wherein when the rechargeable discharge device (104) is charge saturated, the charging state detection device (107) detects and directly or through the charging control device (102) cuts off the current passing through the power excitation windings (103) to cause the conductive device (112) to release the clamping force on the rechargeable discharge device (104), and then the rechargeable discharge device (104) disconnects from the conductive device (112) to stop charging; the disconnection being implemented by making use of gravity or the thrust of the prestressing spring (106).

7. The power charging device with charge saturation disconnector through electromagnetic force release as claimed in claim 6, wherein the conductive device (112) is installed for coupling with the conductive structure installed on one side of the rechargeable discharge device (104), and clamping structure (229) controlled by the magnetic actuator conductive device (110) is installed for clamping the rechargeable discharge device (104) when the rechargeable discharge device (104) is placed in the conductive device (112).

8. The power charging device with charge saturation disconnector through electromagnetic force release as claimed in claim 1, wherein the conductive device (112) of the magnetic actuator conductive device (110) is simultaneously driven by power excitation to cause prestressing of the conductive device (112) and to charge the rechargeable discharge device (104); the conductive device (112) being driven by the power excitation windings (103) of the magnetic actuator conductive device (110) to release clamping to the rechargeable discharge device (104) to stop charging when charge saturation occurs.

9. The power charging device with charge saturation disconnector through electromagnetic force release as claimed in claim 8, wherein the conductive device (112) is installed for coupling with the conductive structure installed on one side of the rechargeable discharge device (104), and clamping structure (229) controlled by the magnetic actuator conductive device (110) is installed for clamping the rechargeable discharge device (104) when the rechargeable discharge device (104) is placed in the conductive structure (112).

10. The power charging device with charge saturation disconnector through electromagnetic force release as claimed in claim 1, wherein the conductive device (112) of the magnetic actuator conductive device (110) is driven by power excitation to make use of the excitation current passing through the power excitation windings (103) to drive the conductive device (112) to clamp and charge the rechargeable discharge device (104); the power excitation to the power excitation windings (103) terminated to cause the conductive device (112) to release clamping of the rechargeable discharge device (104) to stop charging when charge saturation occurs.

11. The power charging device with charge saturation disconnector through electromagnetic force release as claimed in claim 10, wherein the conductive device (112) is installed for coupling with the conductive structure installed on one side of the rechargeable discharge device (104), and clamping structure (229) controlled by the magnetic actuator conductive device (110) is installed for clamping the rechargeable discharge device (104) when the rechargeable discharge device (104) is placed in the conductive device (112).

12. The power charging device with charge saturation disconnector through electromagnetic force release as claimed in claim 1, further comprising electromagnetic driving suction device (114), which is displaced upon being actuated through the charging control device (102) controlling the power excitation current passing through the power excitation windings (103) when the rechargeable discharge device (104) is charged, a space vacated by the displacement being used for installing the rechargeable discharge device (104); wherein when the rechargeable discharge device (104) is charge saturated, the charging state detection device (107) detects and directly or through the charging control device (102) cuts off the power excitation current passing through the power excitation windings (103), and the prestressing spring (106) is driven to cause the electromagnetic driving suction device (114) to push the rechargeable discharge device (104) away from the conductive device (112) to stop charging;

wherein the electromagnetic driving suction device (114) is equipped with the power excitation windings (103) and the prestressing spring (106) to form an electromagnetic force driving and spring force reversion mechanism.

13. The power charging device with charge saturation disconnector through electromagnetic force release as claimed in claim 1, wherein the power charging device with charge saturation disconnector through electromagnetic force release further is arranged to provide a synchronous power switch function, in which a synchronous power switch is installed at a position for interacting with the magnetic actuator conductive device (110); and wherein when the rechargeable discharge device (104) is placed in the conductive device (112) and the magnetic actuator conductive device (110) is forced to move to deform, the synchronous power switch is touched simultaneously to supply power to the rechargeable discharge device (104) for charging; the synchronous power switch being formed by electromechanical or solid state switches characterized by at least one of the following:

the switch is triggered by mechanical displacement, photoelectric operation, pressure operation, acoustic operation, static electricity operation, manipulation of magnetic induction, operation of electromagnetic induction, and capacitive sensor operation, and a reed contact (126) is installed with the conductive device (112), or a touch switch (117) is installed for simultaneously starting power when the rechargeable discharge device (104) is placed in the conductive device (112), and to simultaneously cut off power when the rechargeable discharge device (104) disconnects from the conductive device (112).

14. The power charging device with charge saturation disconnector through electromagnetic force release as claimed in claim 13, wherein the conductive device (112) is installed for coupling with the conductive structure installed on one side of the rechargeable discharge device (104), and clamping structure (229) controlled by the magnetic actuator conductive device (110) is installed for clamping the rechargeable discharge device (104) when the rechargeable discharge device (104) is placed in the conductive device (112); and further the reed contact (126) is installed for forming a synchronous operation switch with the conductive device (112) for clamping the rechargeable discharge device (104) when the rechargeable discharge device (104) is placed in the conductive device (112); or the conductive device (112) is installed for coupling with the conductive structure installed on one side of the rechargeable discharge device (104), and clamping structure (229) controlled by the magnetic actuator conductive device (110) is installed for clamping the rechargeable discharge device (104) when the rechargeable discharge device (104) is placed in the conductive device (112).

15. A power charging device with charge saturation disconnector through electromagnetic force release, wherein a magnetic circuit with iron-core (127) of the magnetic actuator conductive device (110) is driven by means of the charge current passing through the power excitation windings (103), and then the conductive device (112) clamps and charges the rechargeable discharge device (104); and wherein the charge current terminates or decreases when charge saturation occurs, and then the magnetic actuator conductive device (110) and the conductive device (112) release the clamped rechargeable discharge device (104) for disconnecting from the conductive device (112) to stop charging, wherein magnetic actuator conductive device (110): is equipped with the conductive device (112) connecting with the charging control device (102) and an electromagnetic actuator (124) at the space for installing the rechargeable discharge device (104); the electromagnetic actuator (124) includes the power excitation windings (103), the magnetic circuit with iron-core (127), the magnetic driving structure (111), the magnetic circuit with iron-core (127), the conductive device (112), and a prestressing spring (116), for attracting the magnetic driving structure (111) when the power excitation windings (103) is powered, to cause the conductive device (112) which is integrated with the magnetic driving structure (111) to clamp and charge the rechargeable discharge device (104), and when the current passing through the power excitation windings (103) decreases or terminates, the magnetic driving structure (111) returns to the original position through the prestressing of the prestressing homing spring (116), and then the conductive device (112) releases the clamped rechargeable discharge device (104);

wherein a parallel shunt circuit device (120) is installed if not all charge current is to be utilized as the power excitation current to the magnetic actuator device (110), the parallel shunt circuit device being formed by electromechanical or electronic circuit elements, or solid state power components, and parallel to two sides of the power excitation windings (103), for controlling the value of the current passing through the power excitation windings (103), and further controlling the disconnecting timing for the magnetic actuator conductive device (110);

wherein when the rechargeable discharge device (104) is placed in the conductive device (112) to cause charge current to pass through the power excitation windings (103), the electromagnetic actuator (124) is attracted by excitation to drive the magnetic driving structure (111) of the magnetic actuator conductive device (110) and the conductive device (112) integrated with the magnetic driving structure (111) to produce the clamping force and charging current; and wherein when the rechargeable discharge device (104) is charged, the voltage thereof gradually rises, and then the charge current decreases and further causes the current passing through the power excitation windings (103) to decrease, or when the current passing through the power excitation windings (103) terminates through the control of the charging control device (102), the excitation of the electromagnetic actuator (124) is terminated, and by means of the prestressing of provided bathe prestressing spring (116), the magnetic driving structure (111) and the conductive device (112) integrated with the magnetic driving structure (111) release the clamped rechargeable discharge device (104).

16. The power charging device with charge saturation disconnector through electromagnetic force release as claimed in claim 15, wherein the prestressing spring (106) is installed at the space within the conductive device (112) for installing the rechargeable discharge device (104), wherein when the current passing through the power excitation windings (103) decreases to the threshold limit value or terminates, the magnetic driving structure (111) and the conductive device (112) integrated with the magnetic driving structure (111) release the clamped rechargeable discharge device (104), and the prestressing spring (106) pushes the rechargeable discharge device (104) to disconnect from the conductive device (112).

17. The power charging device with charge saturation disconnector through electromagnetic force release as claimed in claim 15, wherein a pitch between two conductive devices (112) as the positive and negative electrodes is more than a pitch between two electrodes of the rechargeable discharge device (104) before charging, but after the rechargeable discharge device (104) is placed in between the two conductive devices (112), the two conductive devices (112) are pushed close to contact with the positive and negative electrodes of the rechargeable discharge device (104), and then the rechargeable discharge device (104) is charged by the charging power supply via the two conductive devices (112), and the power excitation windings (103) are powered excitation simultaneously through the charge current to attract the magnetic driving structure (111), and then the conductive device (112) which is integrated with the magnetic driving structure (111) clamps and charges to the rechargeable discharge device (104) continuously, wherein after a positioning ring structure (105) is placed in the rechargeable discharge device (104), press type boot structure (231) is driven by external force, and the two conductive devices (112) are pushed close to conduct with the positive and negative electrodes of the rechargeable discharge device (104), and then the charging power is supplied to the rechargeable discharge device (104) via the two conductive devices (112), and the power excitation windings (103) are excited simultaneously, so that the electromagnetic actuator (124) has an effect to attract the magnetic driving structure (111), and the conductive device (112) is forced to clamp the rechargeable discharge device (104) continuously, and to charge the rechargeable discharge device (104); and wherein when the current passing through the power excitation windings (103) decreases to the threshold limit value or terminates, by means of the prestressing of prestressing spring (116), the magnetic driving structure (111) and the conductive device (112) which is integrated with the magnetic driving structure (111) release the clamped rechargeable discharge device (104) and stop charging.

18. The power charging device with charge saturation disconnector through electromagnetic force release as claimed in claim 1, wherein the conductive device and the clamping structure are separate structures installed at different positions, the conductive device (112) for transmitting the charge power energy is installed against the direction for installing the conductive device (112), and the clamping structure (229) only has a clamping functionality for clamping the side of the rechargeable discharge device (104), and wherein when the rechargeable discharge device (104) is place in the conductive device (112), the charging power supply powers the rechargeable discharge device (104), and the power excitation windings (103) are excited to cause the electromagnetic actuator (124) to clamp the rechargeable discharge device (104); and when the current passing through the power excitation windings (103) decreases or terminates, by means of the prestressing of the prestressing homing spring (116), the magnetic driving structure (111) and the conductive device (112) release the clamped rechargeable discharge device (104).

19. The power charging device with charge saturation disconnector through electromagnetic force release as claimed in claim 18, wherein the conductive device (112) is installed for coupling with the conductive structure installed on one side of the rechargeable discharge device (104), and the clamping structure (229) controlled by the magnetic actuator conductive device (110) is installed for clamping the rechargeable discharge device (104) when the rechargeable discharge device (104) is placed in the conductive device (112).

20. The power charging device with charge saturation disconnector through electromagnetic force release as claimed in claim 1, wherein the conductive device (112) is installed for coupling with the conductive structure installed on one side of the rechargeable discharge device (104), and a prestressing reed (108) is installed between the conductive device (112) and the rechargeable discharge device (104), wherein the prestressing reed (108) is an elastic structure and the prestressing, which is normally along a direction for pushing the rechargeable discharge device (104) away to stop charging, is less than a clamping force of the clamping structure (229), but more than a weight of the rechargeable discharge device (104); the prestressing reed (108) being equipped with a relay conductive structure (1081) for transmitting the power energy of the positive and negative electrodes of the conductive device (112) to the positive and negative electrodes of the rechargeable discharge device (104), wherein when the prestressing reed (108) is made of insulative material, than the relay conductive structure (1081) is directly installed on the prestressing reed (108), and when the prestressing reed (108) is made of conductive material, than there an additional insulator is provided between the relay conductive structure (1081) and the prestressing reed (108); and wherein when the rechargeable discharge device (104) is placed in the conductive device (112), through the operation of a press type boot structure (231), the clamping structure (229) controlled by the magnetic actuator conductive device (110) clamps the rechargeable discharge device (104), and forces the prestressing reed (108) to move, and then the power energy of the conductive device (112) is transmitted to the rechargeable discharge device (104) for charging via the relay conductive structure (1081) installed on the prestressing reed (108), and because the power excitation windings (103) is powered excitation, the clamping structure (229) clamps the rechargeable discharge device (104) continuously; and when charge saturation occurs, the clamping structure (229) disconnects and releases the clamped rechargeable discharge device (104) by means of the prestressing of the prestressing reed (108) such that the rechargeable discharge device (104) disconnects from the conductive device (112) to stop charging.

21. The power charging device with charge saturation disconnector through electromagnetic force release as claimed in claim 1, wherein the electromagnetic driving transposition mechanism (115) is installed within the magnetic actuator conductive device (110) for pushing the rechargeable discharge device (104) away from the position of the magnetic actuator conductive device (110); wherein when the rechargeable discharge device (104) is charge saturated, the power excitation windings (103) drive the electromagnetic driving transposition mechanism (115) for pushing the rechargeable discharge device (104) away from the magnetic actuator conductive device (110) in one of the following ways:

a) the power excitation windings (103) are directly controlled by the charge saturation detection device (107) to be conductive or disconnect to cause the magnetic driving structure (111) to be displaced, and the electromagnetic driving transposition mechanism (115) is driven simultaneously to push the rechargeable discharge device (104), and then the conductive device (112) of the magnetic actuator conductive device (110) releases the clamped rechargeable discharge device (104);

b) a signal of the charge saturation detection device (107) is transmitted to the charging control device (102) to control the power excitation windings (103) to be conductive or disconnect to cause the magnetic driving structure (111) to be displaced, and the electromagnetic driving transposition mechanism (115) is driven simultaneously to push the rechargeable discharge device (104), and then the conductive device (112) of the magnetic actuator conductive device (110) releases the clamped rechargeable discharge device (104);

c) the charging control device (102) performs trickling charge to the rechargeable discharge device (104) for a set time delay, and then the charging control device (102) is driven to control the power excitation windings (103) to be conductive or disconnect to cause the magnetic driving structure (111) to be displaced, and the electromagnetic driving transposition mechanism (115) is driven simultaneously to push the rechargeable discharge device (104), and then the conductive device (112) of the magnetic actuator conductive device (110) releases the clamped rechargeable discharge device (104);

d) a signal from the charge saturation detection device (107) is transmitted to the charging control device (102) to reduce the charge current to the rechargeable discharge device (104) while waiting for the detection charge saturation signal of the charge saturation detection device (107), further driving the charging control device (102) to control the power excitation windings (103) to be conductive or disconnect to cause the magnetic driving structure (111) to be displaced, and the electromagnetic driving transposition mechanism (115) is driven simultaneously to push the rechargeable discharge device (104), and then the conductive device (112) of the magnetic actuator conductive device (110) releases the clamped rechargeable discharge device (104) to implement two-stage charging; and e) the detection charge saturation signal of the charging state detection device (107) repeatedly controls the charging control device (102) to gradually reduce the charge current to the rechargeable discharge device (104), and finally the charging control device (102) is controlled to drive the power excitation windings (103) to be conductive or disconnect to cause the magnetic driving structure (111) to be displaced for pushing the conductive device (112), and when the power excitation windings (103) are excited, the electromagnetic driving transposition mechanism (115) is driven simultaneously to push the rechargeable discharge device (104), and then at least one electrode side of the rechargeable discharge device (104) disconnects from the conductive device (112) to stop charging.

22. The power charging device with charge saturation disconnector through electromagnetic force release as claimed in claim 21, wherein the power charging device with charge saturation disconnector through electromagnetic force release further is arranged to provide a synchronous power switch function, in which a synchronous power switch is installed at a position for interacting with the magnetic actuator conductive device (110); wherein when the rechargeable discharge device (104) is placed in the conductive device (112) and the magnetic actuator conductive device (110) is forced to move to deform, the synchronous power switch is touched simultaneously to make power supply to power the rechargeable discharge device (104) for charging; the synchronous power switch being formed by electromechanical or solid state switches characterized by at least one of the following:

the switch is triggered by mechanical displacement, photoelectric operation, pressure operation, acoustic operation, static electricity operation, manipulation of magnetic induction, operation of electromagnetic induction, and capacitive sensor operation, and a reed contact (126) is installed with the conductive device (112), or a touch switch (117) is installed, for forming a conductive contact of the synchronous operational switch, and the installed position of the synchronous operational switch is at a position in which when the rechargeable discharge device (104) is placed in the conductive device (112), by means of the installation of the rechargeable discharge device (104), or the displacement of the reed of the magnetic actuator conductive device (110), the charging power supply is driven.

* * * * *

UNITED STATES PATENT AND TRADEMARK OFFICE
CERTIFICATE OF CORRECTION

PATENT NO. : 8,269,454 B2
APPLICATION NO. : 12/576281
DATED : September 18, 2012
INVENTOR(S) : Tai-Her Yang It is certified that error appears in the above-identified patent and that said Letters Patent is hereby corrected as shown below:

In the Specification

Col. 18, lines 63-64: change "conductive device (112)" to --rechargeable discharge device (104)--.

In the Claims

Claim 18, line 7 (col. 30, line 18): change "conductive device (112)" to --rechargeable discharge device (104)--.

Signed and Sealed this
Eighth Day of March, 2016

Michelle K. Lee
*Director of the United States Patent and Trademark Office*